(12) United States Patent
Hsiao et al.

(10) Patent No.: US 11,683,850 B2
(45) Date of Patent: Jun. 20, 2023

(54) BLUETOOTH RECONNECTION METHOD AND RELATED APPARATUS

(71) Applicant: Huawei Technologies Co., Ltd., Shenzhen (CN)

(72) Inventors: Wei Ting Hsiao, Shenzhen (CN); Bin Peng, Shenzhen (CN); Liang Wang, Shanghai (CN); Haw-Wei Shu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/634,664

(22) PCT Filed: Aug. 6, 2020

(86) PCT No.: PCT/CN2020/107295
§ 371 (c)(1),
(2) Date: Feb. 11, 2022

(87) PCT Pub. No.: WO2021/027666
PCT Pub. Date: Feb. 18, 2021

(65) Prior Publication Data
US 2022/0304094 A1    Sep. 22, 2022

(30) Foreign Application Priority Data
Aug. 14, 2019 (CN) .......................... 201910750864.8

(51) Int. Cl.
*H04W 76/19* (2018.01)
*H04W 4/80* (2018.01)
(Continued)

(52) U.S. Cl.
CPC .......... *H04W 76/19* (2018.02); *H04B 1/7156* (2013.01); *H04W 68/02* (2013.01); *H04W 76/27* (2018.02); *H04B 2201/71346* (2013.01)

(58) Field of Classification Search
CPC ..... H04W 76/19; H04W 68/02; H04W 76/27; H04W 8/00; H04W 76/14; H04W 4/80;
(Continued)

(56) References Cited

U.S. PATENT DOCUMENTS 10,070,293 B2    9/2018  Lu et al.
10,149,340 B1 *  12/2018 Rabii .................... H04W 76/25
(Continued)

FOREIGN PATENT DOCUMENTS

CN      101668332 A    3/2010
CN      104967971 A    10/2015
(Continued)

OTHER PUBLICATIONS

ITU-T H.264, Jun. 2019, "Series H: Audiovisual and Multimedia Systems, Infrastructure of audiovisual services—Coding of moving video, Advanced video coding for generic audiovisual services," 836 pages.

*Primary Examiner* — Andrew Wendell
(74) *Attorney, Agent, or Firm* — Conley Rose, P.C.

(57) ABSTRACT

A BLUETOOTH reconnection method is used in a BLUETOOTH connection system that includes a first device and a second device. The method includes that the first device sends a BLUETOOTH Low Energy (BLE) advertising signal to the second device after a BLUETOOTH connection between the first device and the second device is disconnected. If the second device determines that the received BLE advertising signal is a first BLE advertising signal, the second device does not page the first device, and waits to receive a page packet sent by the first device. If the second device determines that the received BLE advertising signal is a second BLE advertising signal, the second device actively pages the first device, and the first device waits to receive a page packet sent by the second device.

20 Claims, 13 Drawing Sheets

(51) Int. Cl.
*H04W 76/27* (2018.01)
*H04B 1/7156* (2011.01)
*H04W 68/02* (2009.01)

(58) Field of Classification Search
CPC ..... H04W 8/005; H04W 76/11; H04W 76/28; H04W 74/0891; H04B 1/7156; H04B 2201/71346
See application file for complete search history.

(56) References Cited

U.S. PATENT DOCUMENTS

| | | | |
|---|---|---|---|
| 10,652,844 B1* | 5/2020 | De la Broise | H04L 1/1678 |
| 2003/0197488 A1 | 10/2003 | Hulvey | |
| 2010/0046496 A1 | 2/2010 | Hall | |
| 2012/0190302 A1* | 7/2012 | Reunamaki | H04W 8/005 |
| | | | 455/41.2 |
| 2013/0094491 A1* | 4/2013 | Sun | H04W 52/383 |
| | | | 370/310 |
| 2015/0201440 A1 | 7/2015 | Gao et al. | |
| 2015/0289124 A1 | 10/2015 | Palin et al. | |
| 2017/0223579 A1* | 8/2017 | Lee | H04W 76/18 |
| 2017/0303070 A1* | 10/2017 | Batra | H04L 1/00 |
| 2018/0103338 A1 | 4/2018 | Lu et al. | |
| 2018/0152806 A1 | 5/2018 | Zhang et al. | |
| 2019/0007193 A1* | 1/2019 | Fu | H04L 7/0331 |
| 2019/0014549 A1 | 1/2019 | Kwan et al. | |
| 2019/0253857 A1 | 8/2019 | Li et al. | |
| 2020/0252993 A1* | 8/2020 | Srivastava | H04W 52/0274 |
| 2023/0004234 A1* | 1/2023 | Jung | H02J 50/12 |

FOREIGN PATENT DOCUMENTS

| | | |
|---|---|---|
| CN | 105392212 A | 3/2016 |
| CN | 108419226 A | 8/2018 |
| CN | 109417758 A | 3/2019 |
| CN | 106464308 B | 2/2020 |
| WO | 2016206528 A1 | 12/2016 |

* cited by examiner

BLUETOOTH RECONNECTION METHOD AND RELATED APPARATUS

CROSS-REFERENCE TO RELATED APPLICATIONS

This is a U.S. National Stage of International Patent Application No. PCT/CN2020/107295 filed on Aug. 6, 2020, which claims priority to Chinese Patent Application No. 201910750864.8 filed on Aug. 14, 2019. Both of the aforementioned applications are hereby incorporated by reference in their entireties.

TECHNICAL FIELD

This application relates to the field of electronic technologies, and in particular, to a Bluetooth reconnection method and a related apparatus.

BACKGROUND

Bluetooth (Bluetooth) is a common data transmission manner in people's life, and short-distance wireless data transmission between electronic devices (for example, mobile terminals, laptop computers, wireless headsets, and palmtop computers) can be implemented through the Bluetooth. The Bluetooth has advantages of convenience, flexibility, and security. Generally, as a distance between electronic devices that have been connected through the Bluetooth increases, a Bluetooth connection may be disconnected.

In the current technology, when a Bluetooth connection is disconnected due to a non-manual operation, in order to restore the Bluetooth connection, a peripheral device (for example, a wireless headset, a smart speaker, and a smart watch) may initiate a reconnection to a central device (for example, a mobile terminal, a laptop computer, and a palmtop computer) that has been connected to the peripheral device through the Bluetooth. However, in this manner of initiating the reconnection, a connection failure is prone to occur. For example, the central device may page (page) the peripheral device when the peripheral device pages the central device, and two page requests collide, resulting in a Bluetooth connection failure.

SUMMARY

This application provides a Bluetooth reconnection method and a related apparatus, to improve a success rate of a Bluetooth reconnection.

According to a first aspect, this application provides a Bluetooth reconnection method, where the method is used in a Bluetooth connection system, the Bluetooth connection system includes a first device and a second device, and the method includes: The first device sends a first Bluetooth low energy BLE advertising signal to the second device when a Bluetooth connection is disconnected, where the first BLE advertising signal is used to indicate the first device to initiate paging page to the second device; the first device sends a first page packet to the second device, where the first page packet includes a device identifier of the second device; the first device sends a first FHS packet to the second device when receiving, within preset duration or a preset quantity of times, a first ID packet sent by the second device, where the first ID packet includes the device identifier of the second device, and is sent by the second device to the first device based on the first page packet, and the first FHS packet includes a Bluetooth address and clock information of the first device; the second device switches to a connection state based on the received first FHS packet, and sends a second ID packet to the first device, where the second ID packet includes the device identifier of the second device; and the first device switches to the connection state based on the received second ID packet. This manner can avoid a page request collision caused by sending page packets by the first device and the second device at the same time, and improve a success rate of a Bluetooth reconnection.

With reference to the first aspect, in a possible implementation, the method further includes: The first device sends a second BLE advertising signal to the second device when the first device does not receive, within the preset duration, the first ID packet sent by the second device, where the second BLE advertising signal is used to indicate the second device to initiate paging to the first device; the second device sends a second page packet to the first device based on the received second BLE advertising signal, where the second page packet includes a device identifier of the first device; the first device sends a third ID packet to the second device based on the received second page packet, where the third ID packet includes the device identifier of the first device; the second device sends a second FHS packet to the first device based on the received third ID packet, where the second FHS packet includes a Bluetooth address and clock information of the second device; the first device switches to the connection state based on the received second FHS packet, and sends a fourth ID packet to the second device, where the fourth ID packet includes the device identifier of the first device; and the second device switches to the connection state based on the received fourth ID packet.

With reference to the first aspect, in a possible implementation, the method further includes: When the first device receives, within the preset duration, the first ID packet sent by the second device, the first device switches from a page state to a master page response master page response state.

With reference to the first aspect, in a possible implementation, the method further includes: When the first device receives the second page packet sent by the second device, the first device switches from a page scan page scan state to a slave page response state; and when the second device receives the third ID packet sent by the first device, the second device switches from a page state to a master page response master page response state.

With reference to the first aspect, in a possible implementation, that the first device sends a first Bluetooth low energy BLE advertising signal to the second device when a Bluetooth connection is disconnected includes: The first device sends the first BLE advertising signal to the second device when a received signal strength indicator RRSI of the Bluetooth connection is less than a preset threshold or an error code indicating connection timeout connection timeout is received.

With reference to the first aspect, in a possible implementation, when the Bluetooth connection is disconnected, the second device is in a Bluetooth low energy scan BLE scan state.

With reference to the first aspect, in a possible implementation, the device identifier of the first device may include a device access code (device access code, DAC) or an inquiry access code (inquiry access code, IAC) of the first device, and the device identifier of the second device may include a DAC or an IAC of the second device.

With reference to the first aspect, in a possible implementation, after the Bluetooth connection is disconnected, the second device may further display reconnection indication information, where the reconnection indication information is used to indicate that the second device is restoring the Bluetooth connection.

With reference to the first aspect, in a possible implementation, the first BLE advertising signal includes a first AD structure, the first AD structure includes first data, and the first data is used to indicate the first device to send a page request to the second device. The second BLE advertising signal includes a second AD structure, the second AD structure includes second data, and the second data is used to indicate the second device to send a page request to the first device.

With reference to the first aspect, in a possible implementation, after the second device receives a page packet sent by the first device, the second device may stop BLE scanning. In this manner, power consumption of the second device can be reduced.

With reference to the first aspect, in a possible implementation, after the second device receives the second BLE advertising signal, the second device may stop BLE scanning. In this manner, power consumption of the second device can be reduced.

According to a second aspect, embodiments of this application provide a Bluetooth reconnection method, where the method is used in a Bluetooth connection system, the Bluetooth connection system includes a first device and a second device, and the method includes: The first device sends a second BLE advertising signal to the second device when a Bluetooth connection is disconnected, where the second BLE advertising signal is used to indicate the second device to initiate paging to the first device; the second device sends a second page packet to the first device based on the received second BLE advertising signal, where the second page packet includes a device identifier of the first device; the first device sends a third ID packet to the second device based on the received second page packet, where the third ID packet includes the device identifier of the first device; the second device sends a second FHS packet to the first device based on the received second ID packet, where the second FHS packet includes a Bluetooth address and clock information of the second device; the first device switches to a connection state based on the received second FHS packet, and sends a fourth ID packet to the second device; and the second device switches to the connection state based on the received fourth ID packet. This manner can avoid a page request collision caused by sending page packets by the first device and the second device at the same time, and improve a success rate of a Bluetooth reconnection.

With reference to the second aspect, in a possible implementation, the method further includes: When the first device receives the second page packet sent by the second device, the first device switches from a page scan state to a slave page response state; and when the second device receives the third ID packet sent by the first device, the second device switches from a page state to a master page response state.

With reference to the second aspect, in a possible implementation, that the first device sends a second BLE advertising signal to the second device when a Bluetooth connection is disconnected includes: The first device sends the second BLE advertising signal to the second device when a received signal strength indicator RRSI of the Bluetooth connection is less than a preset threshold or an error code indicating connection timeout connection timeout is received.

With reference to the second aspect, in a possible implementation, the device identifier of the first device may include a DAC or an IAC of the first device, and the device identifier of the second device may include a DAC or an IAC of the second device.

With reference to the second aspect, in a possible implementation, after the Bluetooth connection is disconnected, the second device may further display reconnection indication information, where the reconnection indication information is used to indicate that the second device is restoring the Bluetooth connection.

With reference to the second aspect, in a possible implementation, the second BLE advertising signal includes a second AD structure, the second AD structure includes second data, and the second data is used to indicate the second device to send a page request to the first device.

With reference to the second aspect, in a possible implementation, after the second device receives the second BLE advertising signal, the second device may stop BLE scanning. In this manner, power consumption of the second device can be reduced.

According to a third aspect, embodiments of this application provide a first device, where the first device includes a Bluetooth chip, a memory, and one or more processors. The memory is coupled to the one or more processors, and the Bluetooth chip supports a classic Bluetooth BR/EDR function and a BLE function. The memory is configured to store computer program code, and the computer program code includes computer instructions. When the computer instructions are executed by the one or more processors, the first device is enabled to perform the following operations: sending a first Bluetooth low energy BLE advertising signal to a second device when a Bluetooth connection is disconnected, where the first BLE advertising signal is used to indicate the first device to initiate paging page to the second device; sending a first page packet to the second device, where the first page packet includes a device identifier of the second device; sending a first FHS packet to the second device when a first ID packet sent by the second device is received within preset duration, where the first ID packet includes the device identifier of the second device, and is sent by the second device to the first device based on the first page packet, and the first FHS packet includes a Bluetooth address and clock information of the first device; and switching to a connection state based on a received second ID packet sent by the second device, where the second ID packet is sent by the second device to the first device based on the first FHS packet.

With reference to the third aspect, in a possible implementation, when the computer instructions are executed by the one or more processors, the first device is enabled to further perform the following operations: sending a second BLE advertising signal to the second device when the first ID packet sent by the second device is not received within the preset duration, where the second BLE advertising signal is used to indicate the second device to initiate paging to the first device; receiving a second page packet sent by the second device, where the second page packet includes a device identifier of the first device, and is sent by the second device to the first device based on the second BLE advertising signal; sending a third ID packet to the second device based on the second page packet, where the third ID packet includes the device identifier of the first device; switching to a connection state based on a received second FHS packet sent by the second device, where the second FHS packet includes a Bluetooth address and clock information of the second device, and is sent by the second device to the first device based on the third ID packet; and sending a fourth ID packet to the second device based on the second FHS packet, where the fourth ID packet includes the device identifier of the first device.

With reference to the third aspect, in a possible implementation, when the computer instructions are executed by the one or more processors, the first device is enabled to further perform the following operation: switching from a page state to a master page response master page response state when the first ID packet sent by the second device is received within the preset duration.

With reference to the third aspect, in a possible implementation, w % ben the computer instructions are executed by the one or more processors, the first device is enabled to further perform the following operation: switching from a page scan state to a slave page response state when the second page packet sent by the second device is received.

With reference to the third aspect, in a possible implementation, when the computer instructions are executed by the one or more processors, the first device is enabled to specifically perform the following operation: sending the first BLE advertising signal to the second device when a received signal strength indicator RRSI of the Bluetooth connection is less than a preset threshold or an error code indicating connection timeout connection timeout is received.

With reference to the third aspect, in a possible implementation, the device identifier of the first device may include a DAC or an IAC of the first device, and the device identifier of the second device may include a DAC or an IAC of the second device.

With reference to the third aspect, in a possible implementation, the first BLE advertising signal includes a first AD structure, the first AD structure includes first data, and the first data is used to indicate the first device to send a page request to the second device. The second BLE advertising signal includes a second AD structure, the second AD structure includes second data, and the second data is used to indicate the second device to send a page request to the first device.

According to a fourth aspect, embodiments of this application provide a first device, where the first device includes a Bluetooth chip, a memory, and one or more processors. The memory is coupled to the one or more processors, and the Bluetooth chip supports a BR/EDR function and a BLE function. The memory is configured to store computer program code, and the computer program code includes computer instructions. When the computer instructions are executed by the one or more processors, the first device is enabled to perform the following operations: sending a second BLE advertising signal to a second device when a Bluetooth connection is disconnected, where the second BLE advertising signal is used to indicate the second device to initiate paging to the first device; receiving a second page packet sent by the second device, where the second page packet includes a device identifier of the first device, and is sent by the second device to the first device based on the second BLE advertising signal; sending a third ID packet to the second device based on the second page packet, where the third ID packet includes the device identifier of the first device; switching to a connection state based on a received second FHS packet sent by the second device, where the second FHS packet includes a Bluetooth address and clock information of the second device, and is sent by the second device to the first device based on the third ID packet; and sending a fourth ID packet to the second device based on the second FHS packet, where the fourth ID packet includes the device identifier of the first device, and is used to indicate the second device to switch to the connection state.

With reference to the fourth aspect, in a possible implementation, when the computer instructions are executed by the one or more processors, the first device is enabled to further perform the following operation: switching from a page scan state to a slave page response state when the second page packet sent by the second device is received.

With reference to the fourth aspect, in a possible implementation, when the computer instructions are executed by the one or more processors, the first device is enabled to specifically perform the following operation: sending the second BLE advertising signal to the second device when a received signal strength indicator RRSI of the Bluetooth connection is less than a preset threshold or an error code indicating connection timeout connection timeout is received.

With reference to the fourth aspect, in a possible implementation, the device identifier of the first device may include a DAC or an TAC of the first device, and the device identifier of the second device may include a DAC or an IAC of the second device.

With reference to the fourth aspect, in a possible implementation, the second BLE advertising signal includes a second AD structure, the second AD structure includes second data, and the second data is used to indicate the second device to send a page request to the first device.

According to a fifth aspect, embodiments of this application provide a Bluetooth chip, where the Bluetooth chip is configured to perform the following operations: sending a first Bluetooth low energy BLE advertising signal to a second device when a Bluetooth connection is disconnected, where the first BLE advertising signal is used to indicate the first device to initiate paging page to the second device; sending a first page packet to the second device, where the first page packet includes a device identifier of the second device; sending a first FHS packet to the second device when a first ID packet sent by the second device is received within preset duration, where the first ID packet includes the device identifier of the second device, and is sent by the second device to the first device based on the first page packet, and the first FHS packet includes a Bluetooth address and clock information of the first device; and switching to a connection state based on a received second ID packet sent by the second device, where the second ID packet is sent by the second device to the first device based on the first FHS packet.

With reference to the fifth aspect, in a possible implementation, the Bluetooth chip is further configured to perform the following operations: sending a second BLE advertising signal to the second device when the first ID packet sent by the second device is not received within the preset duration, where the second BLE advertising signal is used to indicate the second device to initiate paging to the first device; receiving a second page packet sent by the second device, where the second page packet includes a device identifier of the first device, and is sent by the second device to the first device based on the second BLE advertising signal; sending a third ID packet to the second device based on the second page packet, where the third ID packet includes the device identifier of the first device; switching to a connection state based on a received second FHS packet sent by the second device, where the second FHS packet includes a Bluetooth address and clock information of the second device, and is sent by the second device to the first device based on the third ID packet; and sending a fourth ID packet to the second device based on the second FHS packet, where the fourth ID packet includes the device identifier of the first device.

With reference to the fifth aspect, in a possible implementation, the Bluetooth chip is further configured to perform the following operation: switching from a page state to a master page response master page response state when the first ID packet sent by the second device is received within the preset duration.

With reference to the fifth aspect, in a possible implementation, the Bluetooth chip is further configured to perform the following operation: switching from a page scan state to a slave page response state when the second page packet sent by the second device is received.

With reference to the fifth aspect, in a possible implementation, the Bluetooth chip is specifically configured to perform the following operation: sending the first BLE advertising signal to the second device when a received signal strength indicator RRSI of the Bluetooth connection is less than a preset threshold or an error code indicating connection timeout connection timeout is received.

With reference to the fifth aspect, in a possible implementation, the device identifier of the first device may include a DAC or an IAC of the first device, and the device identifier of the second device may include a DAC or an IAC of the second device.

With reference to the fifth aspect, in a possible implementation, the first BLE advertising signal includes a first AD structure, the first AD structure includes first data, and the first data is used to indicate the first device to send a page request to the second device. The second BLE advertising signal includes a second AD structure, the second AD structure includes second data, and the second data is used to indicate the second device to send a page request to the first device.

According to a sixth aspect, embodiments of this application provide a Bluetooth chip, where the Bluetooth chip is configured to perform the following operations: sending a second BLE advertising signal to a second device when a Bluetooth connection is disconnected, where the second BLE advertising signal is used to indicate the second device to initiate paging to the first device; receiving a second page packet sent by the second device, where the second page packet includes a device identifier of the first device, and is sent by the second device to the first device based on the second BLE advertising signal; sending a third ID packet to the second device based on the second page packet, where the third ID packet includes the device identifier of the first device; switching to a connection state based on a received second FHS packet sent by the second device, where the second FHS packet includes a Bluetooth address and clock information of the second device, and is sent by the second device to the first device based on the third ID packet; and sending a fourth ID packet to the second device based on the second FHS packet, where the fourth ID packet includes the device identifier of the first device, and is used to indicate the second device to switch to the connection state.

With reference to the sixth aspect, in a possible implementation, the Bluetooth chip is further configured to perform the following operation: switching from a page scan state to a slave page response state when the second page packet sent by the second device is received.

With reference to the sixth aspect, in a possible implementation, the Bluetooth chip is further configured to perform the following operation: sending the second BLE advertising signal to the second device when a received signal strength indicator RRSI of the Bluetooth connection is less than a preset threshold or an error code indicating connection timeout connection timeout is received.

With reference to the sixth aspect, in a possible implementation, the device identifier of the first device may include a DAC or an IAC of the first device, and the device identifier of the second device may include a DAC or an IAC of the second device.

With reference to the sixth aspect, in a possible implementation, the second BLE advertising signal includes a second AD structure, the second AD structure includes second data, and the second data is used to indicate the second device to send a page request to the first device.

According to a seventh aspect, embodiments of this application provide a Bluetooth connection system, where the Bluetooth system includes a first device and a second device, and the first device is configured to: send a first Bluetooth low energy BLE advertising signal to the second device when a Bluetooth connection is disconnected, where the first BLE advertising signal is used to indicate the first device to initiate paging page to the second device; send a first page packet to the second device, where the first page packet includes a device identifier of the second device; send a first FHS packet to the second device when a first ID packet sent by the second device is received within preset duration, where the first ID packet includes the device identifier of the second device, and is sent by the second device to the first device based on the first page packet, and the first FHS packet includes a Bluetooth address and clock information of the first device; and switch to a connection state based on a received second ID packet sent by the second device. The second device is configured to switch to the connection connection state based on the received first FHS packet, and send the second ID packet to the first device, where the second ID packet includes the device identifier of the second device.

With reference to the seventh aspect, in a possible implementation, the first device is further configured to, send a second BLE advertising signal to the second device when the first ID packet sent by the second device is not received within the preset duration, where the second BLE advertising signal is used to indicate the second device to initiate paging to the first device; send a third ID packet to the second device based on a received second page packet sent by the second device, where the third ID packet includes a device identifier of the first device; and switch to the connection state based on a received second FHS packet sent by the second device, and send a fourth ID packet to the second device, where the fourth ID packet includes the device identifier of the first device. The second device is further configured to: send the second page packet to the first device based on the received second BLE advertising signal, where the second page packet includes the device identifier of the first device; send the second FHS packet to the first device based on the received third ID packet, where the second FHS packet includes a Bluetooth address and clock information of the second device; and switch to the connection state based on the received fourth ID packet.

With reference to the seventh aspect, in a possible implementation, the first device is further configured to switch from a page state to a master page response master page response state when the first ID packet sent by the second device is received within the preset duration.

With reference to the seventh aspect, in a possible implementation, the first device is further configured to switch from a page scan page scan state to a slave page response state when the second page packet sent by the second device is received.

With reference to the seventh aspect, in a possible implementation, the first device is further configured to switch from a page state to a master page response master page response state when the third ID packet sent by the first device is received.

With reference to the seventh aspect, in a possible implementation, the first device is specifically configured to send the first BLE advertising signal to the second device when a received signal strength indicator RRSI of the Bluetooth connection is less than a preset threshold or an error code indicating connection timeout connection timeout is received.

With reference to the seventh aspect, in a possible implementation, when the Bluetooth connection is disconnected, the second device is in a Bluetooth low energy scan BLE scan state.

With reference to the seventh aspect, in a possible implementation, the device identifier of the first device may include a DAC or an IAC of the first device, and the device identifier of the second device may include a DAC or an IAC of the second device.

With reference to the seventh aspect, in a possible implementation, the first BLE advertising signal includes a first AD structure, the first AD structure includes first data, and the first data is used to indicate the first device to send a page request to the second device. The second BLE advertising signal includes a second AD structure, the second AD structure includes second data, and the second data is used to indicate the second device to send a page request to the first device.

With reference to the seventh aspect, in a possible implementation, the second device is further configured to stop BLE scanning after a page packet sent by the first device is received. In this manner, power consumption of the second device can be reduced.

With reference to the seventh aspect, in a possible implementation, the second device is further configured to stop BLE scanning after the second BLE advertising signal is received. In this manner, power consumption of the second device can be reduced.

According to an eighth aspect, embodiments of this application provide a Bluetooth connection system, where the Bluetooth connection system includes a first device and a second device, and the first device is configured to: send a second BLE advertising signal to the second device when a Bluetooth connection is disconnected, where the second BLE advertising signal is used to indicate the second device to initiate paging to the first device; send a third ID packet to the second device based on a received second page packet sent by the second device, where the third ID packet includes a device identifier of the first device; and switch to a connection state based on a received second FHS packet sent by the second device, and send a fourth ID packet to the second device. The second device is configured to: send the second page packet to the first device based on the received second BLE advertising signal sent by the first device, where the second page packet includes the device identifier of the first device; send the second FHS packet to the first device based on the received second ID packet sent by the first device, where the second FHS packet includes a Bluetooth address and clock information of the second device; and switch to the connection state based on the received fourth ID packet sent by the first device.

With reference to the eighth aspect, in a possible implementation, the first device is further configured to switch from a page scan state to a slave page response state when the second page packet sent by the second device is received.

With reference to the eighth aspect, in a possible implementation, the second device is further configured to switch from a page state to a master page response state when the third ID packet sent by the first device is received.

With reference to the eighth aspect, in a possible implementation, the first device is specifically configured to send the second BLE advertising signal to the second device when a received signal strength indicator RRSI of the Bluetooth connection is less than a preset threshold or an error code indicating connection timeout connection timeout is received.

With reference to the eighth aspect, in a possible implementation, when the Bluetooth connection is disconnected, the second device is in a BLE scan state.

With reference to the eighth aspect, in a possible implementation, the device identifier of the first device may include a DAC or an IAC of the first device, and the device identifier of the second device may include a DAC or an IAC of the second device.

With reference to the eighth aspect, in a possible implementation, the second BLE advertising signal includes a second AD structure, the second AD structure includes second data, and the second data is used to indicate the second device to send a page request to the first device.

With reference to the eighth aspect, in a possible implementation, the second device is further configured to stop BLE scanning after a page packet sent by the first device is received. In this manner, power consumption of the second device can be reduced.

With reference to the eighth aspect, in a possible implementation, the second device is further configured to stop BLE scanning after the second BLE advertising signal is received. In this manner, power consumption of the second device can be reduced.

According to a ninth aspect, embodiments of this application provide a computer storage medium, including computer instructions. When the computer instructions are run on an electronic device, the electronic device is enabled to perform the Bluetooth reconnection method according to any possible implementation of the first aspect or any possible implementation of the second aspect.

According to a tenth aspect, embodiments of this application provide a computer program product. When the computer program product runs on a computer, the computer is enabled to perform the Bluetooth reconnection method according to any possible implementation of the first aspect or any possible implementation of the second aspect.

In the embodiments of this application, the first device may be a Bluetooth headset, and the second device may be a mobile terminal. After a Bluetooth connection between the mobile terminal and the Bluetooth headset is disconnected, the Bluetooth headset sends a BLE advertising signal to the mobile terminal. If the mobile terminal determines that the received BLE advertising signal is a first BLE advertising signal, the mobile terminal does not page the Bluetooth headset, and waits to receive a page packet sent by the Bluetooth headset. If the mobile terminal determines that the received BLE advertising signal is a second BLE advertising signal, the mobile terminal actively pages the Bluetooth headset, and the Bluetooth headset waits to receive a page packet sent by the mobile terminal. This manner can avoid a page request collision caused by sending page packets by the mobile terminal and the Bluetooth headset at the same time, and improve a success rate of a Bluetooth reconnection.

DESCRIPTION OF EMBODIMENTS

Figure 1A:
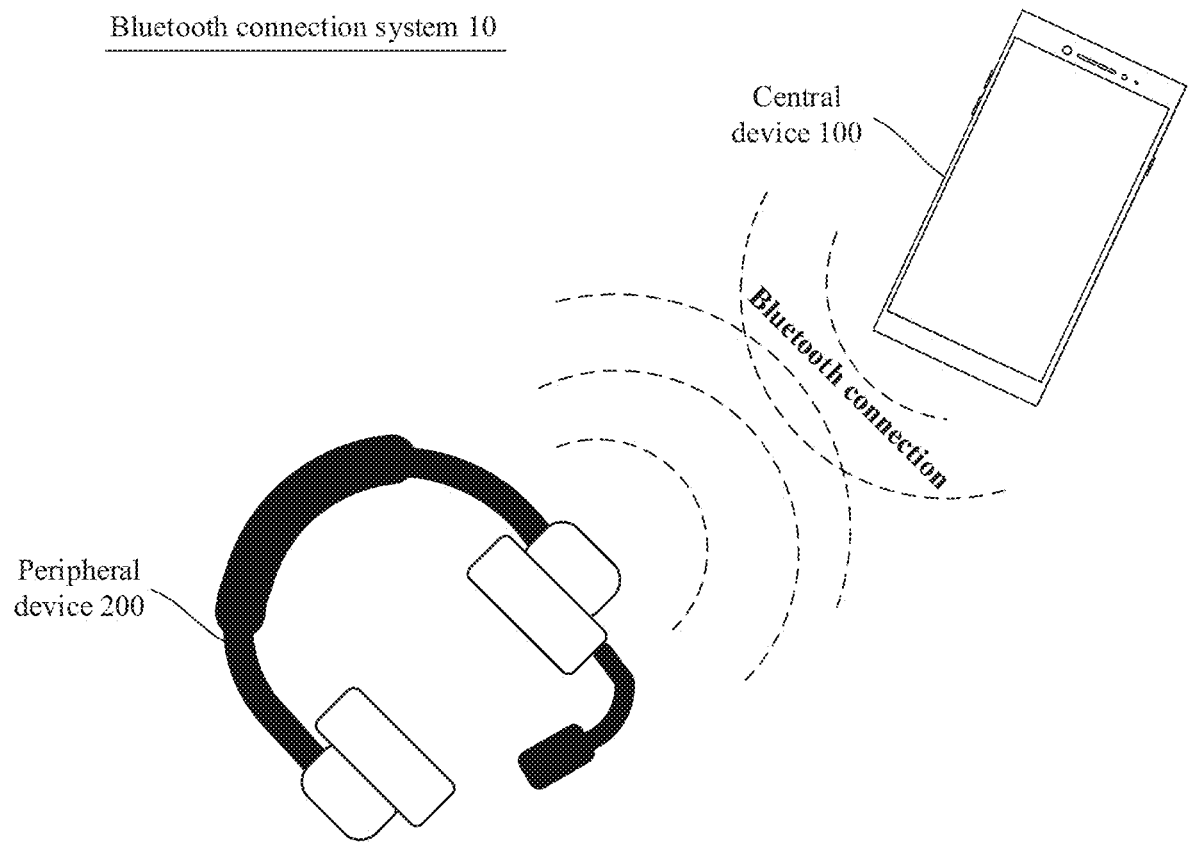
FIG. 1A is a schematic diagram of a Bluetooth connection system according to an embodiment of this application.

The following clearly describes technical solutions in the embodiments of this application in detail with reference to accompanying drawings. In descriptions of the embodiments of this application, unless otherwise stated, "/" indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of the embodiments of this application, "a plurality of" means two or more.

The terms "first" and "second" mentioned below are merely intended for description, and shall not be understood as an indication or implication of relative importance or implicit indication of a quantity of indicated technical features. Therefore, a feature limited by "first" or "second" may explicitly or implicitly include one or more features. In the descriptions of the embodiments of this application, unless otherwise specified, "a plurality of" means two or more.

A user interface (user interface, UI) in the embodiments of this application is a medium interface for interaction and information exchange between an application or an operating system and a user. The user interface implements conversion between an internal form of information and a form acceptable to the user. A user interface of an application is source code written in a specific computer language such as Java or an extensible markup language (extensible markup language, XML). The interface source code is parsed and rendered on an electronic device 300, and is finally presented as content that can be identified by the user, for example, a control such as a picture, a text, or a button. A control (control) is a basic element of a user interface. Typical controls include a button (button), a widget (widget), a toolbar (toolbar), a menu bar (menu bar), a text box (text box), a scrollbar (scrollbar), a picture, and a text. Attributes and content of controls in an interface are defined by tags or nodes. For example, controls included in an interface are defined by nodes such as <Textview>, <ImgView>, and <VideoView> in the XML. One node corresponds to one control or attribute in the interface. After being parsed and rendered, the node is displayed as user-visible content. In addition, interfaces of many applications such as a hybrid application (hybrid application) usually further include a web page. A web page, also referred to as a page, may be understood as a special control embedded in an interface of an application. A web page is source code written in a specific computer language, such as a hypertext markup language (hypertext markup language, HTML), cascading style sheets (cascading style sheets, CSS), or JavaScript (JavaScript, JS). The web page source code may be loaded and displayed as user-recognizable content by a browser or a web page display component with a function similar to a function of the browser. Specific content included in the web page is also defined by tags or nodes in the web page source code. For example, elements and attributes of a web page are defined by <p>, <img>, <video>, and <canvas> in the HTML.

A common representation form of the user interface is a graphical user interface (graphical user interface, GUI), and is a user interface that is displayed in a graphical manner and related to a computer operation. The graphical user interface may be an interface element such as an icon, a window, or a control displayed on a display of an electronic device.

The following describes a Bluetooth connection system provided in the embodiments of this application. FIG. 1A is a schematic diagram of a Bluetooth connection system according to an embodiment of this application. A Bluetooth connection system 10 may include a central device 100 and a peripheral device 200.

The central device 100 may be an electronic device having a Bluetooth connection function, such as a mobile terminal, a tablet computer, a notebook computer, or a personal computer. For example, the central device 100 is a mobile terminal in FIG. 1A. The peripheral device 200 may be an electronic device having a Bluetooth connection function, such as a wireless (Bluetooth) headset, a smart speaker, a smart watch, a portable media playback device, or an in-vehicle media playback device. For example, the peripheral device 200 is a wireless headset in FIG. 1A. The central device 100 and the peripheral device 200 may be connected through Bluetooth.

Currently, a Bluetooth connection may be disconnected in two cases. In one case, the central device receives an operation of disabling the Bluetooth function of the central device that is entered by a user in an interface of the central device, and in response to the operation, the Bluetooth connection between the central device and the peripheral device is disconnected; alternatively, the peripheral device receives an operation of disabling the Bluetooth function (or a power supply) of the peripheral device that is entered by the user on an interface or a button of the peripheral device, and in response to the operation, the Bluetooth connection between the central device and the peripheral device is disconnected. This manner of disconnecting the Bluetooth connection may be referred to as "active disconnection". For example, the user operation of actively disconnecting the Bluetooth connection received by the central device may be: an operation in which the user taps an on/off control in a Bluetooth setting interface of the central device (refer to a user operation performed by the user on an on/off control 201 in an embodiment corresponding to FIG. 1B), or an operation in which the user taps a Bluetooth control in a shortcut menu of the central device (refer to a user operation performed by the user on a Bluetooth control 210 in an embodiment corresponding to FIG. 1C). In addition, when the central device actively disconnects the Bluetooth connection, the central device receives an error code (error code) such as "connection terminated by local host", and the peripheral device receives an error code such as "remote user terminated connection".

In the other case, the Bluetooth connection is disconnected due to an extended distance or poor signal quality of the Bluetooth connection. This manner of disconnecting the Bluetooth connection may be referred to as "passive disconnection". For example, a Bluetooth received signal strength indicator (received signal strength indicator, RRSI) of the central device is lower than a threshold. The threshold may be set, for example, may be −80 dBm or −90 dBm. This case can be considered as a passive disconnection of the Bluetooth connection. In addition, when the Bluetooth connection of the central device or peripheral device is passively disconnected, an error code such as "connection timeout" is received. Alternatively, parameters such as a packet loss rate and a packet error rate may be lower than a threshold. Generally, after the Bluetooth connection is passively disconnected, the peripheral device 200 actively sends a page packet to the paired central device 100 (a central device that is connected most recently), to restore the Bluetooth reconnection method. For this Bluetooth reconnection method, refer to a method flowchart shown in FIG. 1D. The method shown in FIG. 1D includes the following steps.

S101: When a Bluetooth connection is passively disconnected, the peripheral device sends a page packet to the central device.

Specifically, when the Bluetooth connection is passively disconnected, the peripheral device enters a page state. After the peripheral device enters the page state, the peripheral device sends the page packet to the central device. Optionally, the peripheral device sends a page packet at a preset interval in a new frequency. The page packet sent by the peripheral device includes a device access code (device access code, DAC) of the central device.

There are three different access codes (access codes) in a Bluetooth system a device access code, a channel access code (channel access code, CAC), and an inquiry access code (inquiry access code, IAC). The device access code is used in page, page scan, and page response processes, and is generated based on a Bluetooth address (BD_ADDR) of an electronic device that is paged. The channel access code is used in a connection (connection) state, and is used as a packet header (packet header) of a data frame exchanged on a physical channel in a Bluetooth network. The CAC includes preamble, sync word, and trailer bits, and a total length of the CAC is 72 bits. The CAC is generated based on a LAP of a BD_ADDR of an electronic device that initiates paging. The inquiry access code is used in an inquiry (inquiry) state. Once transmitted as self-contained information without a packet header, the DAC and IAC do not include the trailer bit. In this case, a length of the inquiry access code is up to 68 bits.

It should be noted that when the Bluetooth connection is passively disconnected, the central device is in a page scan state. When the central device is in the page scan state, the central device selects a new listening frequency every 1.28 s based on a paging hopping sequence (paging hopping sequence), to monitor the device access code of the central device. The paging hopping sequence used by the central device is a well-defined periodic sequence, and frequencies of the paging hopping sequence are evenly distributed on 79 frequency channels on a 2.4 G frequency band. Duration for scanning on one paging frequency channel by the central device may be referred to as a page scan window (page scan windows), and a size of the page scan window is fixed. An interval between start time of two consecutive page scan windows may be referred to as a page scan interval (page scan interval), and the page scan interval is fixed. A value range of the page scan interval may be 11.25 ms to 2560 ms. The central device monitors the device access code (device access code, DAC) of the central device in a time period in which a scan window exists.

S102: After receiving the page packet sent by the peripheral device, the central device sends an ID packet to the peripheral device based on the page packet.

Specifically, the central device may send the ID packet to the peripheral device based on the page packet in the following manner: The central device determines that the page packet includes the DAC of the central device, and sends the ID packet to the peripheral device. The ID packet carries the device access code or an inquiry access code (inquiry access code, IAC) of the central device. A total length of the ID packet is 68 bits. In this case, the central device switches from a page scan (page scan) state to a slave page response (slave page response) state.

S103: After receiving the ID packet sent by the central device, the peripheral device sends an FHS packet to the central device based on the ID packet.

The FHS packet is a special control packet indicating a Bluetooth address and a sender clock (CLK) of the electronic device. The FHS packet can be used for a master page response, an inquiry response, and frequency hopping synchronization. Specifically, the FHS packet sent by the peripheral device to the central device includes information such as a Bluetooth address and a real-time clock of the peripheral device. It should be noted that, after receiving the ID packet sent by the central device, the peripheral device switches from a page state to a master page response (master page response) state.

S104: After receiving the FHS packet sent by the peripheral device, the central device sends an ID packet to the peripheral device based on the FHS packet.

The ID packet carries the device access code or the inquiry access code of the central device. After receiving the FHS packet sent by the peripheral device, the central device switches from the slave page response state to the connection (connection) state. In addition, after receiving the ID packet sent by the central device, the peripheral device switches from the master page response (slave page response) state to the connection (connection) state. In this case, both the central device and the peripheral device are in the connection state, and the Bluetooth connection is restored.

Optionally, after receiving the ID packet sent by the central device, the peripheral device may send a poll packet to the central device based on the ID packet. The poll packet is used to check whether a slave device (the central device) is started. After receiving the poll packet, the central device may send any type of packet to the peripheral device based on the poll packet.

It should be noted that, in some scenarios, after the Bluetooth connection is passively disconnected, the central device also initiates paging to the peripheral device. For example, the central device is an intelligent terminal, and the peripheral device is a Bluetooth headset. When the user plays a song in a music player on the intelligent terminal by using the Bluetooth headset, if the Bluetooth headset leaves an area near the intelligent terminal and exceeds a maximum distance supported by the Bluetooth connection from the intelligent terminal, the Bluetooth connection is passively disconnected. The music player may send a Bluetooth connection request to the intelligent terminal, and in response to the request, the intelligent terminal initiates paging to the peripheral device. Similarly, a third-party application such as a video playing application or a game application may also send a Bluetooth connection request to the intelligent terminal when the Bluetooth connection is passively disconnected. In another possible scenario, after the Bluetooth connection is passively disconnected, the intelligent terminal may receive a tap operation performed by the user on an unconnected Bluetooth device option in a Bluetooth device interface. In response to the tap operation of the user, the intelligent terminal initiates paging to the Bluetooth headset. For such a tap operation, refer to the tap operation performed by the user on the control 204 in the embodiment corresponding to FIG. 1B.

In the foregoing scenario, when the peripheral device initiates paging to the central device, the central device also initiates paging to the peripheral device. That is, both the central device and the peripheral device are in the page state. In this case, the central device cannot receive the page packet sent by the peripheral device, and the peripheral device cannot receive a page packet sent by the central device. Page requests of the central device and peripheral devices collide. As a result, the Bluetooth connection fails.

In this embodiment of this application, after the Bluetooth connection is passively disconnected, the peripheral device first sends a BLE advertising signal to the central device, where the BLE advertising signal is used to indicate whether the central device is to initiate paging to the peripheral device. If the BLE advertising signal is a first BLE advertising signal that indicates the central device not to initiate paging to the peripheral device, the central device does not initiate paging to the peripheral device, and waits to receive the page packet from the peripheral device. If the BLE advertising signal is a second BLE advertising signal that indicates the central device to initiate paging to the peripheral device, the central device initiates paging to the peripheral device, and the peripheral device waits to receive the page packet sent by the central device. This manner can avoid a collision between page requests of the central device and the peripheral device, and improve a success rate of a Bluetooth reconnection.

In this embodiment of this application, the Bluetooth connection system 10 shown in FIG. 1A is a Bluetooth system based on a Bluetooth Protocol. That is, both the central device 100 and the peripheral device 200 may support a Bluetooth low energy (Bluetooth low energy, BLE) advertising communications function. Specifically, the peripheral device 200 may advertise a BLE advertising signal on a BLE advertising channel, and the central device 100 may scan the BLE advertising channel and receive the BLE advertising signal.

It may be understood that in this embodiment of this application, an example in which the Bluetooth connection system 10 is implemented based on the Bluetooth protocol is used for description. However, an advertising communications manner in this embodiment of this application is not limited to BLE advertising communication, and may alternatively be Wi-Fi advertising communication or another short-range wireless advertising communication (for example, near field communication (near field communication, NFC)). The advertising communication manner is not limited in this embodiment of this application.

Figure 1B:
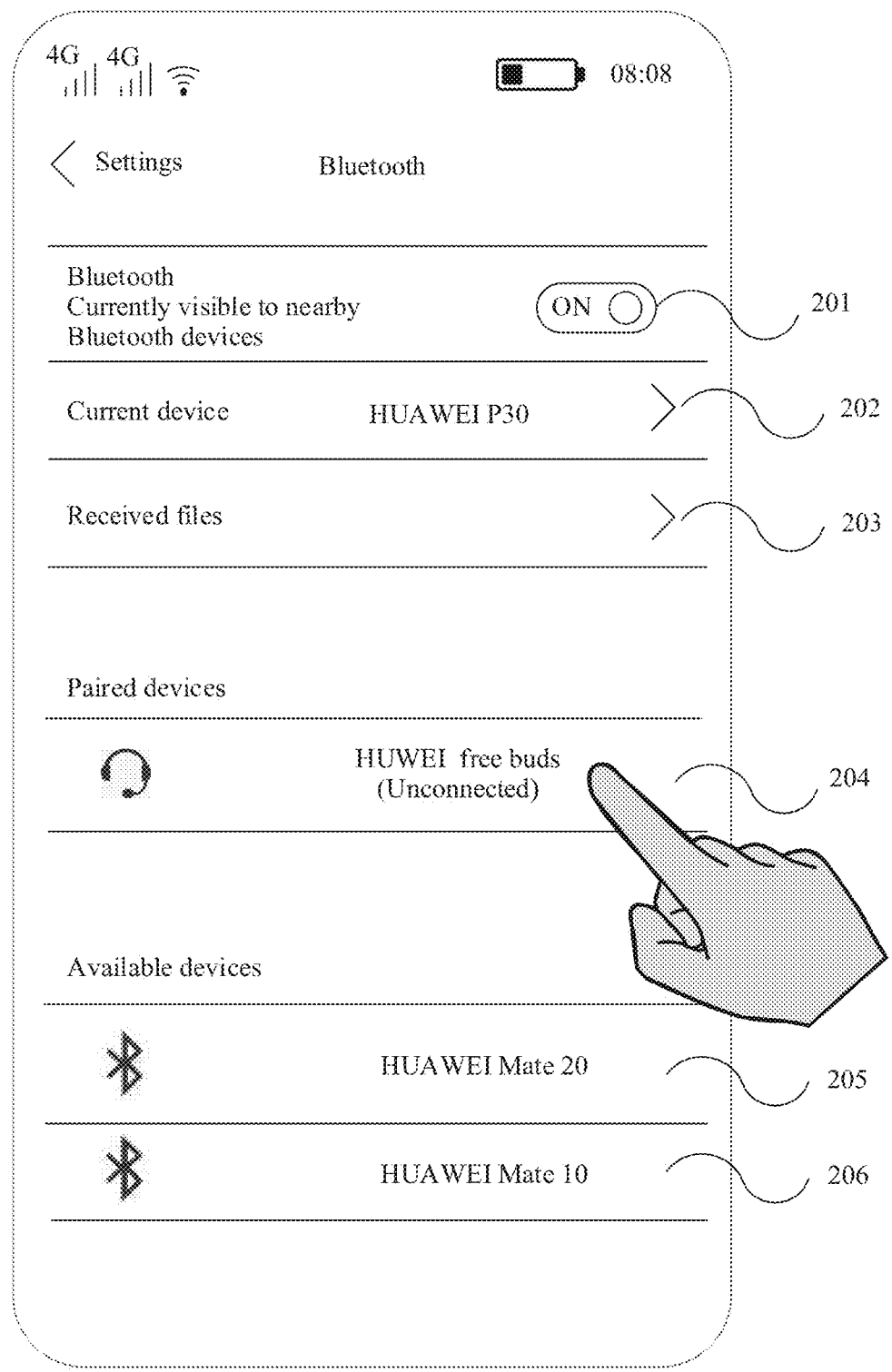
FIG. 1B is a schematic diagram of a Bluetooth setting interface displayed on a central device according to an embodiment of this application.

FIG. 1B is a schematic diagram of a Bluetooth setting interface displayed on the central device 100 according to an embodiment of this application. Specifically, the Bluetooth device interface shown in FIG. 1B includes the on/off control 201, a details control 202, a control 203, the control 204, a control 205, and a control 206.

The on/off control 201 may be used for setting of an on/off state of Bluetooth. Specifically, the on/off control 201 is displayed in two states: an "ON (on)" state and an "OFF (off)" state. When "ON" is displayed in the on/off control 201, if a user operation performed by the user on the on/off control 201 is received, in response to the user operation, the electronic device disables a Bluetooth connection, and switches the on/off control 201 from "ON" to "OFF". It should be noted that this manner of disconnecting the Bluetooth connection is a manner of "actively disconnecting" the Bluetooth connection. The Bluetooth connection may alternatively be disconnected due to another manual operation. For example, the Bluetooth may be switched from the on state to the off state (refer to the embodiment shown in FIG. 1C) due to a user operation performed by the user on the Bluetooth control in a shortcut operation menu, and the Bluetooth may be switched from the on state to the off state due to a voice instruction (for example, "turn off/disconnect the Bluetooth connection") entered by the user. When "OFF" is displayed in the on/off control 201, if a user operation performed by the user on the on/off control 201 is received, in response to the user operation, the electronic device enables the Bluetooth connection, and switches the on/off control 201 from "OFF" to "ON".

The details control 201 may be used for viewing of details information of the Bluetooth of the central device 100, for example, a name of the Bluetooth.

The control 203 may be used to receive a user operation (for example, a tap operation), and in response to the user operation, the central device 100 displays information about a file received through the Bluetooth.

The control 204 may be used to receive a user operation (for example, a tap operation), and in response to the user operation, the central device 100 sends a page packet to a peripheral device HUAWEI free buds indicated by the control 204, to establish a Bluetooth connection. Specifically, the peripheral device HUAWEI free buds indicated by the control 204 is an electronic device that has been successfully paired with the central device 100. Indication information "Disconnected" in the control 204 indicates that the central device 100 does not establish the Bluetooth connection to the peripheral device HUAWEI free buds. If the indication information displayed in the control 204 is "Connected", it indicates that the central device 100 has established the Bluetooth connection to the peripheral device HUAWEI free buds. It should be noted that, if the control 204 receives a user operation after the Bluetooth connection is disconnected due to a non-manual operation, in response to the user operation, the central device 100 sends the page packet to the peripheral device HUAWEI free buds, to restore the Bluetooth connection.

The control 205 may be used to receive a user operation. In response to the user operation, the central device 100 performs Bluetooth pairing with an electronic device HUAWEI Mate 20 indicated by the control 205. After the Bluetooth pairing succeeds, the central device 100 establishes a Bluetooth connection to the electronic device HUAWEI Mate 20. After the Bluetooth connection is successfully established, the Bluetooth connection is successfully established between the central device 100 and the electronic device HUAWEI Mate 20, and data transmission may be performed through the Bluetooth. It should be noted that, after the Bluetooth pairing between the central device 100 and the electronic device HUAWEI Mate 20 succeeds, the central device 100 stores a pairing record of the electronic device HUAWEI Mate 20, and displays information about the electronic device HUAWEI Mate 20 in an information list of "paired devices".

The control 206 may be used to receive a user operation. In response to the user operation, the central device 100 performs Bluetooth pairing with an electronic device HUAWEI Mate 10 indicated by the control 206. After the Bluetooth pairing succeeds, the central device 100 establishes a Bluetooth connection to the electronic device HUAWEI Mate 10. After the Bluetooth connection is successfully established, the Bluetooth connection is successfully established between the central device 100 and the electronic device HUAWEI Mate 10, and data transmission may be performed through the Bluetooth. Similarly, after the Bluetooth pairing between the central device 100 and the electronic device HUAWEI Mate 10 succeeds, the central device 100 stores a pairing record of the electronic device HUAWEI Mate 10, and displays information about the electronic device HUAWEI Mate 10 in the information list of "paired devices".

Figure 1C:
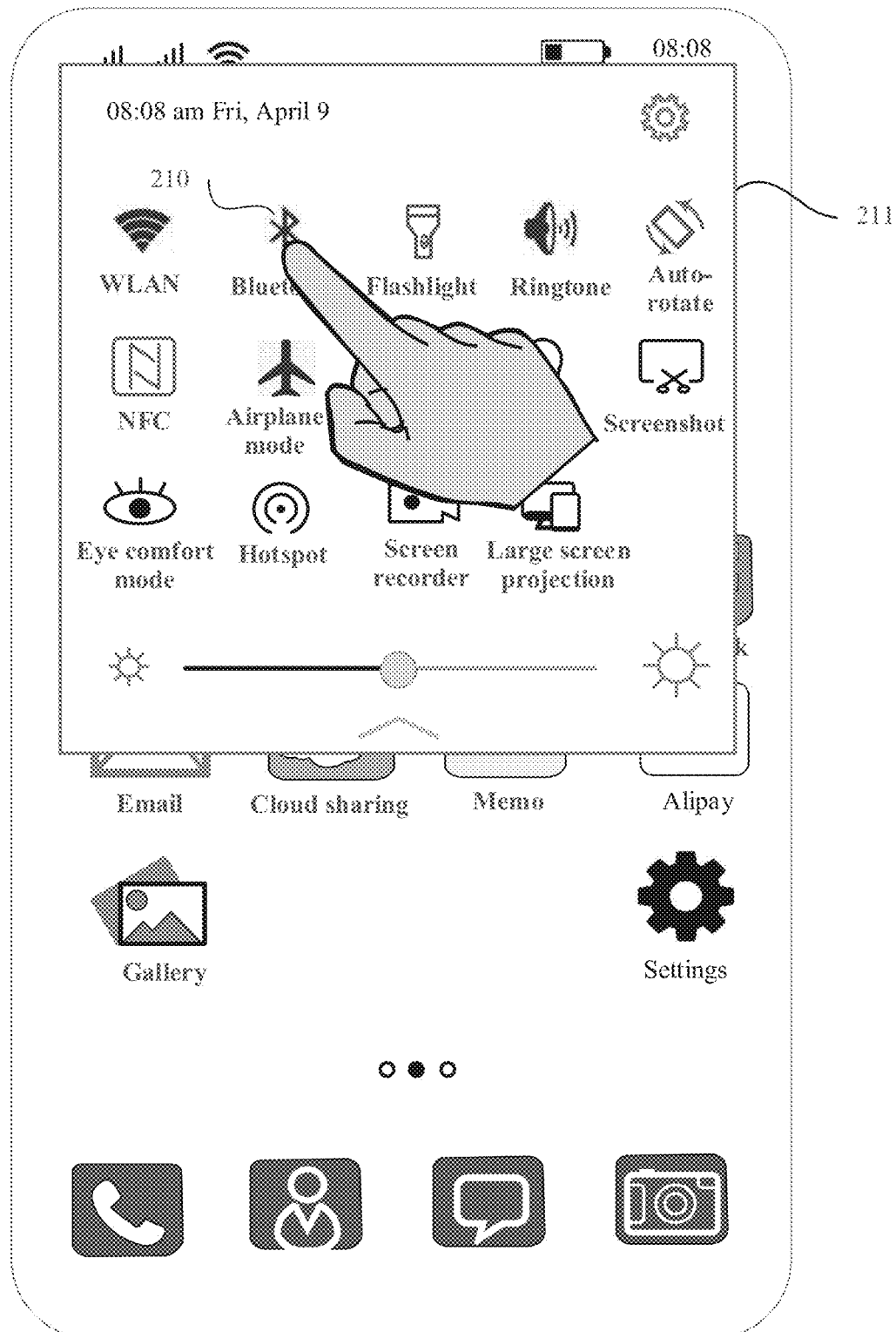
FIG. 1C is a schematic diagram of a shortcut operation menu displayed on a central device according to an embodiment of this application.
Figure 1D:
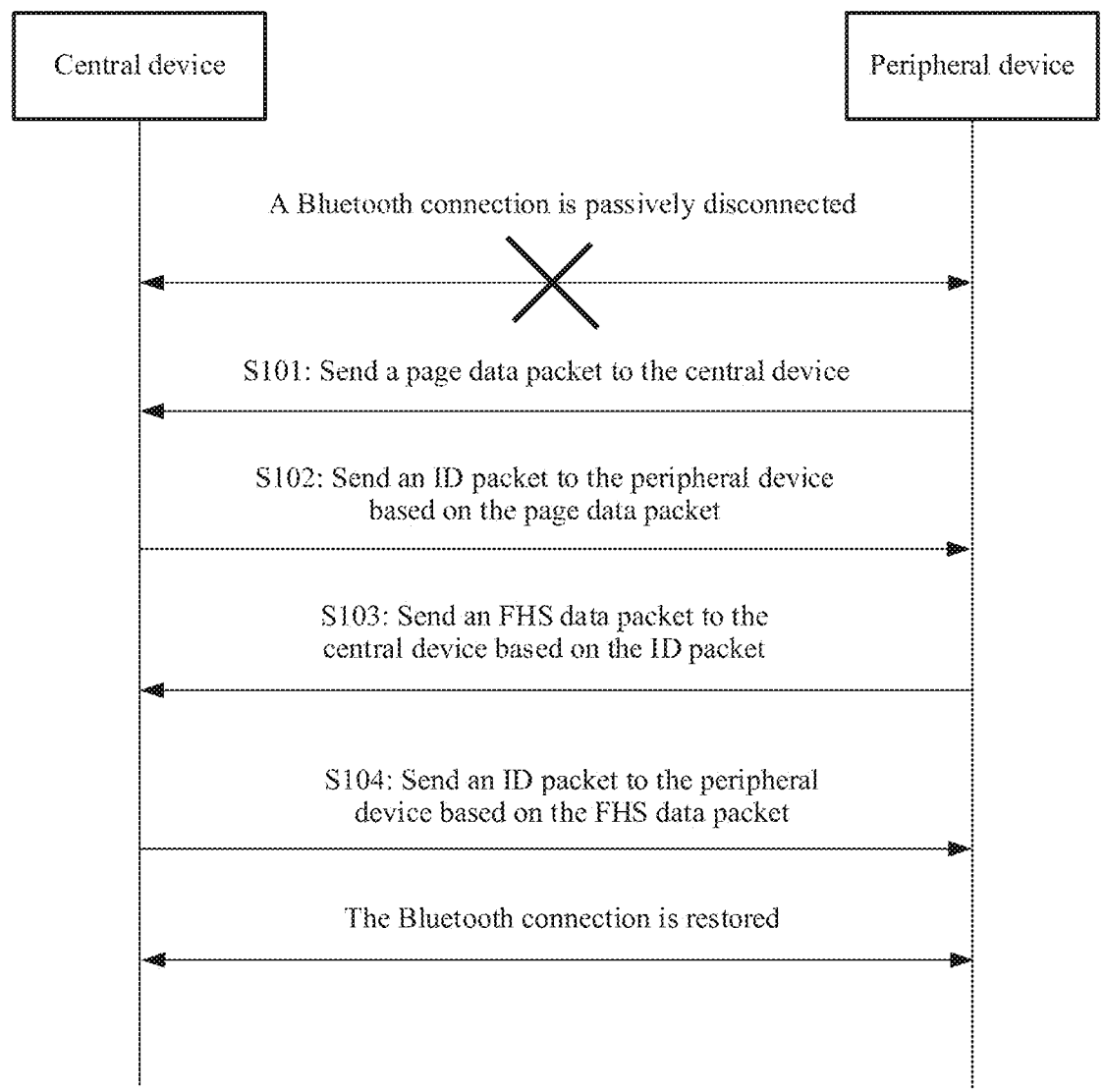
FIG. 1D is a schematic flowchart of a Bluetooth reconnection method according to an embodiment of this application.

FIG. 1C is a schematic diagram of a shortcut operation menu displayed on the central device 100 according to an embodiment of this application. It should be noted that a shortcut operation menu 211 shown in FIG. 1C is a drop-down menu. Optionally, the shortcut operation menu may alternatively be a pull-up menu, a side menu, a floating menu, or the like. This is not limited in the embodiments of this application. Specifically, if a display status of a Bluetooth control 210 in the shortcut menu 211 is highlighted, it indicates that the Bluetooth of the central device 100 is enabled. In this case, if a user operation performed by the user on the Bluetooth control 210 is detected, in response to the user operation, the central device 100 switches the Bluetooth from an on state to an off state and cancels highlighting of the Bluetooth control 210. This manner of disconnecting a Bluetooth connection is a manner of "actively disconnecting" the Bluetooth connection.

Figure 2A:
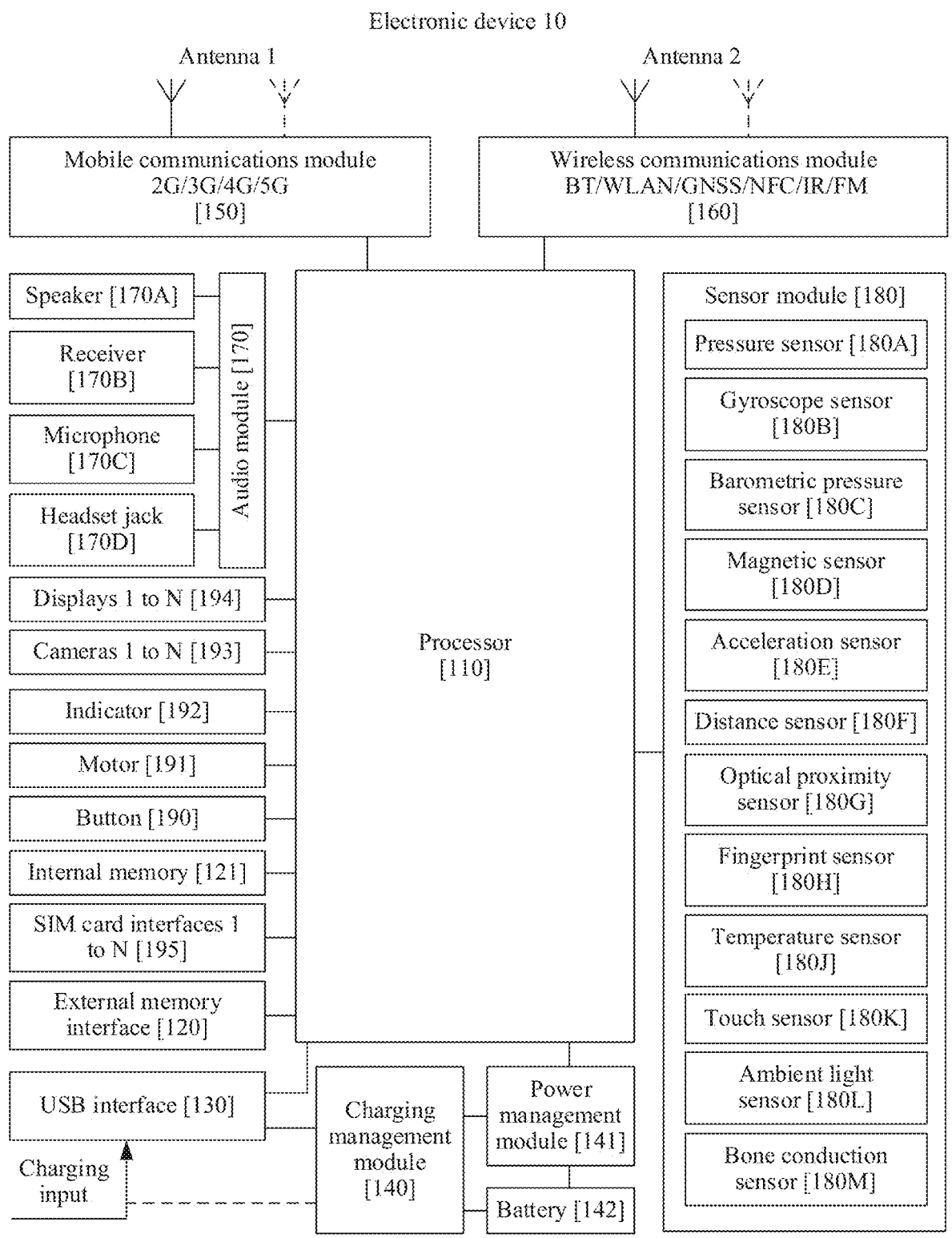
FIG. 2A is a schematic diagram of a structure of an electronic device according to an embodiment of this application.

In the embodiments of this application, the central device 100 may be an electronic device. The following describes an electronic device 10 in the embodiments of this application. FIG. 2A is a schematic diagram of a structure of an electronic device 10 according to this embodiment of this application.

The electronic device 10 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be understood that the electronic device 10 shown in FIG. 2A is merely an example, and may have more or fewer components than those shown in FIG. 2A, or may combine two or more components, or may have different component configurations. Various components shown in the figure may be implemented in hardware that includes one or more signal processing and/or application-specific integrated circuits, software, or a combination of hardware and software.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be separate devices, or may be integrated into one or more processors.

The controller may be a nerve center and a command center of the electronic device 10. The controller may generate an operation control signal based on instruction operation code and a time sequence signal, to complete control of instruction fetching and instruction execution.

A memory may further be disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 10.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call by using the Bluetooth headset. Both the I2S interface and the PCM interface may be configured to perform the audio communication.

The UART interface is a universal serial data bus, and is used for asynchronous communication. The bus may be a two-way communications bus. The bus switches to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music by using the Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a shooting function of the electronic device 10. The processor 110 communicates with the display 194 through the DSI interface, to implement a display function of the electronic device 10.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB interface 130 is an interface that conforms to USB standard specifications, and may be specifically a mini USB interface, a micro USB interface, a USB Type C interface, or the like. The USB interface 130 may be used to connect to a charger for charging the electronic device 10, may be used to transmit data between the electronic device 10 and a peripheral device, or may be configured to connect to a headset, to play audio by using the headset. The interface may be further configured to connect to another electronic device such as an AR device.

It may be understood that an interface connection relationship between the modules that is shown in the embodiments of the present invention is merely an example for description, and does not constitute a limitation on the structure of the electronic device 10. In some other embodiments of this application, the electronic device 10 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the electronic device 10. The charging management module 140 may further supply power to the electronic device by using the power management module 141 when the battery 142 is charged.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communications function of the electronic device 10 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 10 may be configured to cover one or more communications frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 150 may provide a solution that is used in the electronic device 10 and that includes wireless communication such as 2G, 3G, 4G, and 5G. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to a modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some functional modules in the mobile communications module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits an obtained signal to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communications module 150 or another function module.

The wireless communications module 160 may provide a wireless communications solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like and that is used in the electronic device 10. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

The BT and BLE advertising functions in the wireless communications module 160 may be implemented by a Bluetooth chip. When scanning a BLE advertising channel and receives a reconnection advertising signal, the electronic device 10 needs to power on the Bluetooth chip, and enable a software module related to a function of scanning a BLE advertising signal on the Bluetooth chip. In the embodiments of this application, if the central device 100 determines that a Bluetooth connection to the peripheral device 200 is disconnected due to a non-manual operation, the central device 100 may power on the Bluetooth chip by enabling the function of scanning a BLE advertising signal.

In some embodiments, the antenna 1 of the electronic device 10 is coupled to the mobile communications module 150, and the antenna 2 is coupled to the wireless communications module 160, so that the electronic device 10 may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), satellite based augmentation systems (satellite based augmentation systems, SBAS), and/or the like.

The electronic device 10 implements a display function through a GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, quantum dot light emitting diodes (quantum dot light emitting diodes, QLED), or the like. In some embodiments, the electronic device 10 may include one or N displays 194, where N is a positive integer greater than 1.

The electronic device 10 may implement a photographing function through an ISP, the camera 193, a video codec, the GPU, the display 194, the application processor, and the like.

The ISP is configured to process data fed back by the camera 193. For example, during photographing, a shutter is pressed, and a ray of light is transmitted to a photosensitive element of a camera through a lens. An optical signal is converted into an electrical signal. The photosensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and a color temperature of a shooting scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 10 may include one or N cameras 193, where N is a positive integer greater than 1.

The digital signal processor is configured to process a digital signal, and may further process another digital signal in addition to the digital image signal. For example, when the electronic device 10 selects a frequency, the digital signal processor is configured to perform Fourier transformation and the like on frequency energy.

The video codec is configured to compress or decompress a digital video. The electronic device 10 may support one or more video codecs. Therefore, the electronic device 10 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by referring to a structure of a biological neural network, for example, a transfer mode between human brain neurons, and may further continuously perform self-learning. The NPU can implement applications such as intelligent cognition of the electronic device 10, such as image recognition, facial recognition, speech recognition, and text understanding.

The external memory interface 120 may be used to connect to an external storage card, for example, a micro SD card, to extend a storage capability of the electronic device 10. The external storage card communicates with the processor 110 through the external memory interface 120, to implement a data storage function. For example, files such as music and a video are stored in the external storage card.

The internal memory 121 may be configured to store computer executable program code. The executable program code includes instructions. The processor 110 runs the instructions stored in the internal memory 121 to perform various function applications of the electronic device 10 and process data. The internal memory 121 may include a program storage area and a data storage area. The program storage area may store an operating system, an application required by at least one function (for example, a sound playing function or an image playing function), and the like. The data storage area may store data (such as audio data and a phone book) created when the electronic device 10 is used, and the like. In addition, the internal memory 121 may include a high-speed random access memory, or may include a nonvolatile memory, for example, at least one magnetic disk storage device, a flash memory, or a universal flash storage (universal flash storage, UFS).

The electronic device 10 may implement audio functions by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "horn", is configured to convert an electrical audio signal into a sound signal. The electronic device 10 may be used to listen to music or answer a call in a hands-free mode over the speaker 170A.

The receiver 170B, also referred to as an "earpiece", is configured to convert an audio electrical signal into a sound signal. When a call is answered or audio information is listened to by using the electronic device 10, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth, to enter a sound signal to the microphone 170C. At least one microphone 170C may be disposed in the electronic device 10. In some other embodiments, two microphones 170C may be disposed in the electronic device 10, to collect a sound signal and implement a noise reduction function. In some other embodiments, three, four, or more microphones 170C may alternatively be disposed in the electronic device 10, to collect a sound signal, implement noise reduction, and identify a sound source, so as to implement a directional recording function and the like.

The headset jack 170D is configured to connect to a wired headset. The headset jack 170D may be the USB interface 130, or may be a 3.5 mm open mobile terminal platform (open mobile terminal platform, OMTP) standard interface or a Cellular Telecommunications Industry Association of the USA (Cellular Telecommunications Industry Association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 10 determines pressure intensity based on a capacitance change. When a touch operation is performed on the display 194, the electronic device 10 detects intensity of the touch operation by using the pressure sensor 180A. The electronic device 10 may calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on the Messages icon, an instruction for creating an SMS message is executed.

The gyroscope sensor 180B may be configured to determine a motion posture of the electronic device 10. In some embodiments, an angular velocity of the electronic device 10 around three axes (namely, axes X, Y, and Z) may be determined by using the gyroscope sensor 180B. The gyroscope sensor 180B may be configured to perform image stabilization during photographing. For example, when the shutter is pressed, the gyroscope sensor 180B detects an angle at which the electronic device 10 jitters, obtains, through calculation based on the angle, a distance for which a lens module needs to compensate, and allows the lens to cancel the jitter of the electronic device 10 through reverse motion, to implement image stabilization. The gyroscope sensor 180B may be further used in a navigation scenario and a motion-controlled gaming scenario.

The barometric pressure sensor 180C is configured to measure barometric pressure. In some embodiments, the electronic device 10 calculates an altitude based on a barometric pressure value measured by the barometric pressure sensor 180C, to assist in positioning and navigation.

The magnetic sensor 180D includes a Hall effect sensor. The electronic device 10 may detect opening and closing of a flip cover by using the magnetic sensor 180D. In some embodiments, when the electronic device 10 is a clamshell phone, the electronic device 10 may detect opening and closing of the flip cover by using the magnetic sensor 180D. Further, a feature such as automatic unlocking upon opening of the flip cover is set based on a detected opening or closing state of the flip cover.

The acceleration sensor 180E may detect accelerations in various directions (usually on three axes) of the electronic device 10; and may detect magnitude and a direction of gravity when the electronic device 10 is still. The acceleration sensor 180E may be further configured to identify a posture of the electronic device, and used in an application such as switching between landscape mode and portrait mode or a pedometer.

The distance sensor 180F is configured to measure a distance. The electronic device 10 may measure the distance in an infrared or a laser manner. In some embodiments, in a photographing scenario, the electronic device 10 may measure a distance by using the distance sensor 180F to implement quick focusing.

The optical proximity sensor 180G may include, for example, a light-emitting diode (LED) and an optical detector, such as a photodiode. The light-emitting diode may be an infrared light-emitting diode. The electronic device 10 emits infrared light by using the light-emitting diode. The electronic device 10 detects infrared reflected light from a nearby object by using the photodiode. When sufficient reflected light is detected, the electronic device 10 may determine that there is an object near the electronic device 10. When insufficient reflected light is detected, the electronic device 10 may determine that there is no object near the electronic device 10. The electronic device 10 may detect, by using the optical proximity sensor 180G, that the user holds the electronic device 10 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 10 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device 10 is in a pocket, to prevent an accidental touch.

The fingerprint sensor 180H is configured to collect a fingerprint. The electronic device 10 may use a feature of the collected fingerprint to implement fingerprint-based unlocking, application lock access, fingerprint-based photographing, fingerprint-based call answering, and the like.

The temperature sensor 1803 is configured to detect a temperature. In some embodiments, the electronic device 10 executes a temperature processing policy based on the temperature detected by the temperature sensor 1803. For example, when the temperature reported by the temperature sensor 180J exceeds a threshold, the electronic device 10 lowers performance of a processor located near the temperature sensor 1803, to reduce power consumption to implement thermal protection. In some other embodiments, when the temperature is less than another threshold, the electronic device 10 heats the battery 142 to prevent the electronic device 10 from being shut down abnormally due to a low temperature. In some other embodiments, when the temperature is less than still another threshold, the electronic device 10 boosts an output voltage of the battery 142, to avoid abnormal shutdown due to a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor, to determine a type of a touch event. A visual output related to the touch operation may be provided through the display 194. In some other embodiments, the touch sensor 180K may alternatively be disposed on a surface of the electronic device 10 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal. In some embodiments, the bone conduction sensor 180M may alternatively be disposed in the headset, to constitute a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch-sensitive button. The electronic device 10 may receive a button input, and generate a button signal input related to a user setting and function control of the electronic device 10.

The motor 191 may generate a vibration prompt. The motor 191 may be configured to produce an incoming call vibration prompt and a touch vibration feedback. For example, touch operations performed on different applications (for example, shooting and audio playing) may correspond to different vibration feedback effects. For touch operations performed on different areas of the display 194, the motor 191 may also correspond to different vibration feedback effects. Different application scenarios (for example, a time reminder, information receiving, an alarm clock, and a game) may also correspond to different vibration feedback effects. A touch vibration feedback effect may be further customized.

The indicator 192 may be an indicator, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 10. The electronic device 10 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 is also compatible with the external storage card. The electronic device 10 interacts with a network through the SIM card, to implement functions such as calling and data communication. In some embodiments, the electronic device 10 uses an eSIM, that is, an embedded SIM card. The eSIM card may be embedded in the electronic device 10, and cannot be separated from the electronic device 10.

A software system of the electronic device 10 may use a layered architecture, an event-driven architecture, a microkernel architecture, a micro service architecture, or a cloud architecture. In the embodiments of this application, an Android system with a layered architecture is used as an example to describe a software structure of the electronic device 10.

Figure 2B:
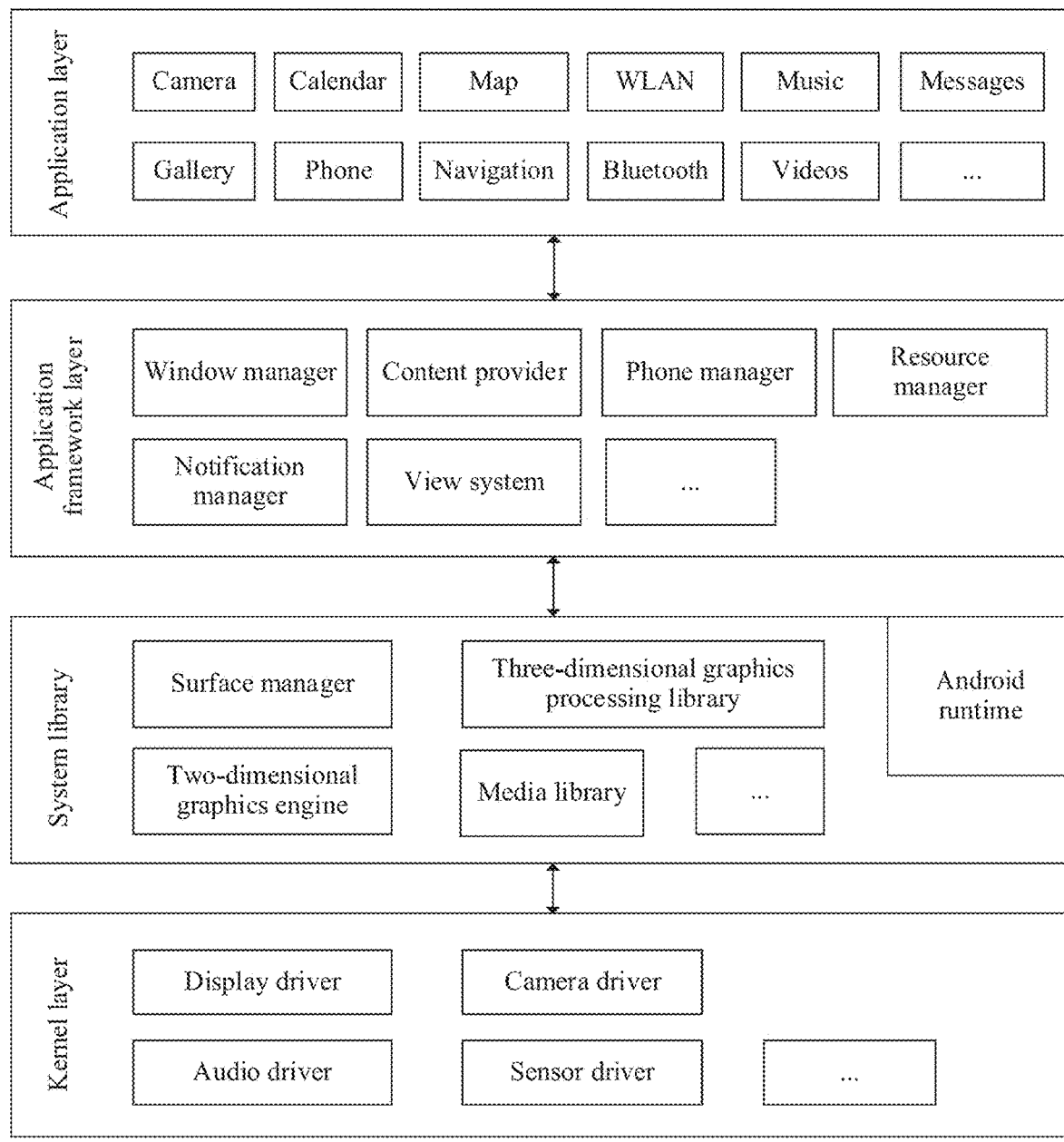
FIG. 2B is a block diagram of a software structure of an electronic device according to an embodiment of this application.

FIG. 2B is a block diagram of a software structure of an electronic device 10 according to an embodiment of this application.

In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages.

As shown in FIG. 2B, the application package may include applications such as Camera, Gallery, Calendar, Phone, Map, Navigation, WLAN, Bluetooth. Music, Videos, and Messages.

The application framework layer provides an application programming interface (application programming interface, API) and a programming framework for an application at the application layer. The application framework layer includes some predefined functions.

As shown in FIG. 2B, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history and a bookmark, a phone book, and the like.

The view system includes a visual control, such as a control for displaying a text or a control for displaying a picture. The view system may be configured to construct an application. A display interface may include one or more views. For example, a display interface including a notification icon of Messages may include a text display view and a picture display view.

The phone manager is configured to provide a communications function of the electronic device 10, for example, management of a call status (including answering, declining, and the like).

The resource manager provides various resources for an application, such as a localized character string, an icon, an image, a layout file, and a video file.

The notification manager enables the application to display notification information in the status bar, and may be configured to convey a notification message. The notification manager may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running in the background, or a notification that appears on the screen in a form of a dialog window. For example, text information is displayed on the status bar, an alert tone is played, a smart terminal vibrates, and the indicator light blinks.

The Android runtime includes a kernel library and a virtual machine. The Android runtime is responsible for scheduling and management of the Android system.

The kernel library includes two parts: a function that needs to be invoked in java language and a kernel library of Android.

The application layer and the application framework layer run in the virtual machine. The virtual machine executes java files at the application layer and the application framework layer as binary files. The virtual machine is configured to perform functions such as object lifecycle management, stack management, thread management, security and exception management, and garbage collection.

The system library may include a plurality of function modules, for example, a surface manager (surface manager), media libraries (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording of a plurality of common audio and video formats, a static image file, and the like. The media library may support a plurality of audio and video coding formats, such as MPEG-4, G.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Figure 2C:
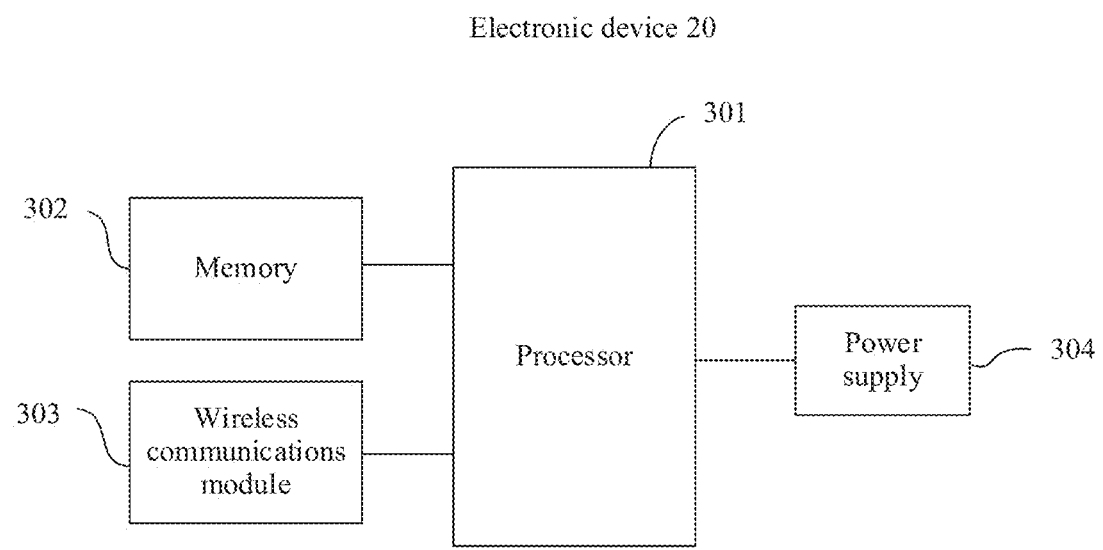
FIG. 2C is a schematic diagram of a structure of another electronic device according to an embodiment of this application.

In the embodiments of this application, the peripheral device 200 may be an electronic device. The following describes an electronic device 20 in the embodiments of this application. FIG. 2C is a schematic diagram of a structure of an electronic device 20 according to this embodiment of this application.

As shown in FIG. 2C, the electronic device 20 may include a processor 301, a memory 302, a wireless communications module 303, and a power supply 304. These components may be connected through a bus.

The processor 301 may be configured to read and execute computer-readable instructions. The processor 301 executes the application program code, so that the electronic device 20 is enabled to perform the method in the embodiments of this application. In a specific implementation, the processor 301 may mainly include a controller, an arithmetic unit, and a register. The controller is mainly responsible for decoding an instruction, and sends a control signal for an operation corresponding to the instruction. The arithmetic unit is mainly responsible for performing a fixed-point or floating-point arithmetic operation, a shift operation, a logic operation, and the like, or may perform an address operation and address conversion. The register is mainly responsible for saving a quantity of register operations, intermediate operation results, and the like that are temporarily stored during instruction execution. In a specific implementation, a hardware architecture of the processor 301 may be an application-specific integrated circuits (Application Specific Integrated Circuits, ASIC) architecture, an MIPS architecture, an ARM architecture, an NP architecture, or the like.

In some embodiments, the processor 301 may be configured to parse a signal received by the wireless communications processing module 303. For example, the received signal may be indication information sent by the electronic device 10, and the indication information is used to indicate that the electronic device 10 receives a manual operation to disconnect a Bluetooth connection. The processor 301 may be configured to perform a corresponding processing operation based on a parsing result. For example, after receiving such a signal, the electronic device 20 does not perform a Bluetooth reconnection. That is, the electronic device 20 does not send a page packet to the electronic device 10.

In some embodiments, the processor 301 may be further configured to generate a signal sent externally by the wireless communications processing module 303, for example, a BLE advertising signal sent by the electronic device 20 to the electronic device 10.

The memory 302 is coupled to the processor 301, and is configured to store various software programs and/or a plurality of sets of instructions. In a specific implementation, the memory 302 may include a high-speed random access memory, and may also include a nonvolatile memory, for example, one or more magnetic disk storage devices, a flash storage device, or another nonvolatile solid-state storage device. The memory 302 may further store a communications program, and the communications program may be used to communicate with the electronic device 10. The memory 302 may further store a Bluetooth address used to uniquely identify the electronic device 20.

The wireless communications processing module 303 may include one or more of a Bluetooth (BT) communications processing module 104A and a WLAN communications processing module 104B. The wireless communications module 303 is configured to support short-distance data exchange between the electronic device 20 and the electronic device 10. In some embodiments, the wireless communications module 303 may include a Bluetooth transceiver, and the Bluetooth transceiver supports a BLE advertising function. Specifically, the Bluetooth transceiver may be configured to send a BLE reconnection advertising signal. The wireless communications module 303 may further include a Wi-Fi module, and the Wi-Fi module may send a reconnection advertising signal.

The power supply 304 may be configured to supply power to each component included in the electronic device 20. In some embodiments, the power supply 304 may be a battery such as a rechargeable battery.

It can be understood that the structure shown in the embodiments of this application does not constitute a specific limitation on the electronic device 20. In addition, the electronic device 20 may have more or fewer components than those shown in the FIG. 2C, may combine two or more components, or may have different component configurations. The components shown in the FIG. 2C may be implemented by hardware, software, or a combination of software and hardware.

Figure 3:
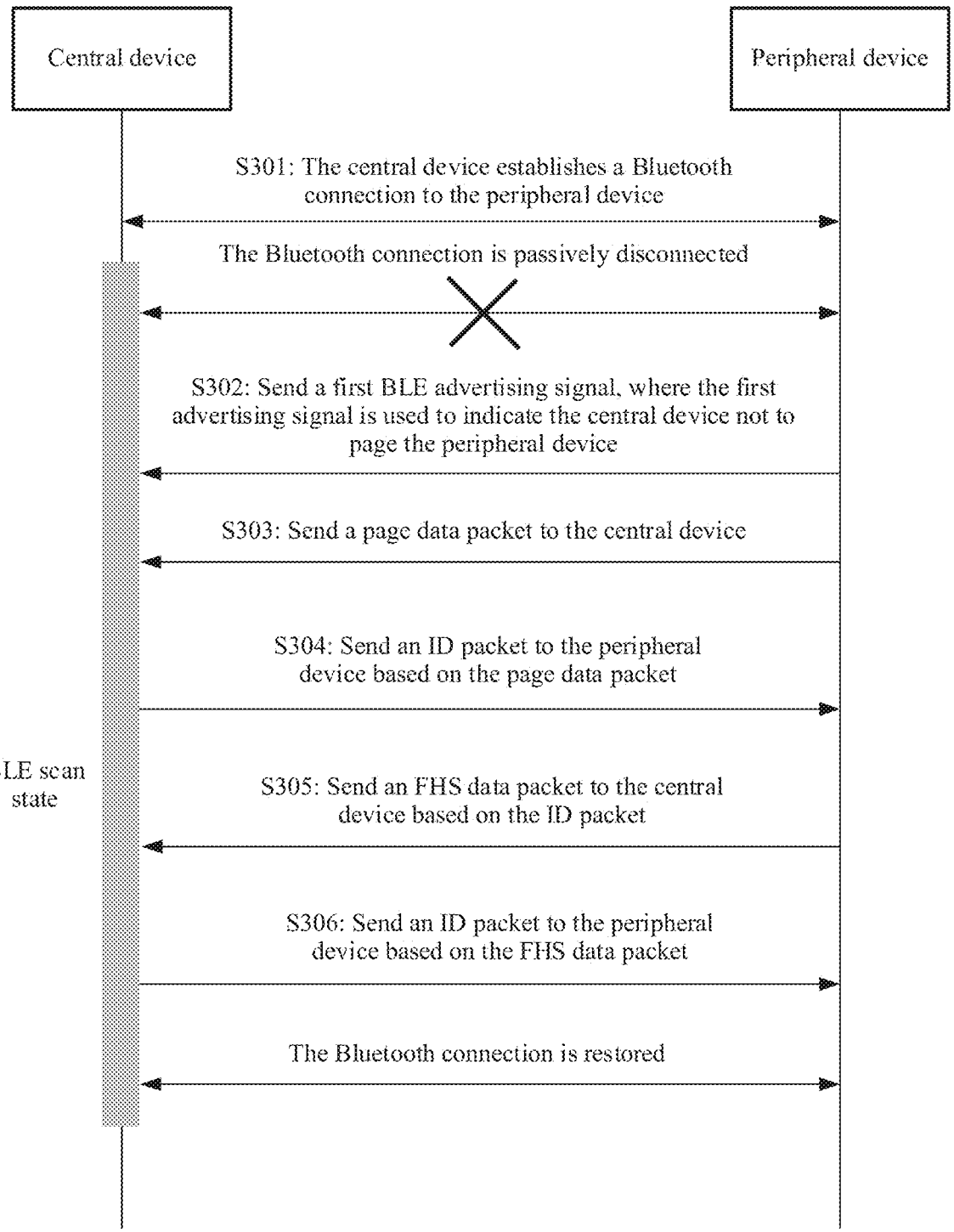
FIG. 3 is a schematic flowchart of another Bluetooth reconnection method according to an embodiment of this application.

The following describes in detail, based on the Bluetooth connection system 10, the electronic device 10, and the electronic device 20 that are described in the foregoing content, the Bluetooth reconnection method provided in the embodiments of this application with reference to other accompanying drawings. It should be noted that, in this embodiment of this application, the Bluetooth connection is passively disconnected. For a meaning of passive disconnection, refer to the description in the foregoing content. Details are not described herein again. In the following embodiments provided in this application, the peripheral device may be referred to as a first device, and the central device may be referred to as a second device. FIG. 3 is a schematic flowchart of a Bluetooth reconnection method according to an embodiment of this application. The method includes at least the following steps.

S301: A central device establishes a Bluetooth connection to a peripheral device.

The Bluetooth connection established between the central device and the peripheral device is a BR/EDR (Basic Rate/Enhanced Data Rate) connection, which is also referred to as a classic Bluetooth connection or a conventional Bluetooth connection.

In a possible implementation, after the central device establishes the Bluetooth connection to the peripheral device, the central device enters a BLE scan state. In another possible implementation, after the Bluetooth connection is passively disconnected, the central device enters the BLE scan state. For example, after receiving an error code such as "connection timeout", the central device may enter the BLE scan state. In this manner, power consumption of the central device can be reduced.

After entering the BLE scan state, the central device enables BLE scanning, to listen to a BLE advertising signal in an ambient environment of a mobile terminal. A process in which the central device scans the BLE advertising signal may be that the central device successively scans BLE advertising signals on a plurality of advertising channels (for example, a BLE advertising channel 37 (2402 MHz), a BLE advertising channel 38 (2426 MHz), and a BLE advertising channel 39 (2480 MHz)). Duration during which the central device scans on one BLE advertising channel may be referred to as a scanning window, and a size of the scanning window is fixed (for example, the size of the scanning window may range from 10 ms to 10.24 s). An interval between start time of two consecutive scanning windows may be referred to as a scanning interval, and the scanning interval is fixed (for example, the scanning interval may be 10 ms to 10.24 s).

Figure 4A:
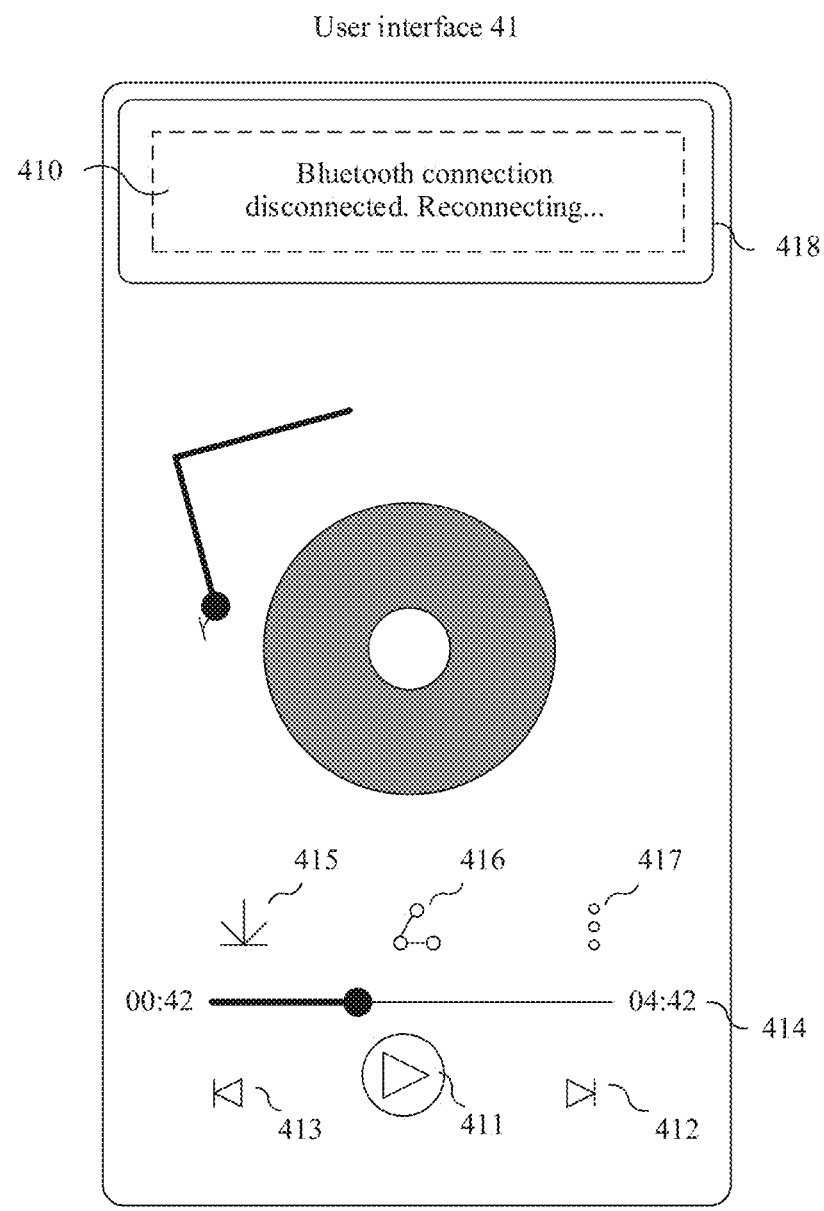
FIG. 4A is a schematic diagram of a user interface for displaying reconnection indication information on a central device according to an embodiment of this application.

In a possible implementation, after the Bluetooth connection is passively disconnected, the central device may further display reconnection indication information on a display, where the reconnection indication information is used to indicate that the central device is restoring the Bluetooth connection. For a schematic diagram of a user interface for displaying the reconnection indication information, refer to FIG. 4A. FIG. 4A is described in detail in subsequent content. Details are not described herein.

S302: After the Bluetooth connection is passively disconnected, the peripheral device sends a first BLE advertising signal to the central device, where the first BLE advertising signal is used to indicate the central device not to page the peripheral device.

Optionally, when the Bluetooth connection of the peripheral device meets a preset condition, it is determined that the Bluetooth connection is passively disconnected. The preset condition may be that an RSSI value of the Bluetooth connection is lower than a threshold. The threshold may be set, for example, may be −80 dBm or −90 dBm. Optionally, if the peripheral device receives the error code such as "connection timeout", it is determined that the Bluetooth connection is passively disconnected.

Figure 4B:
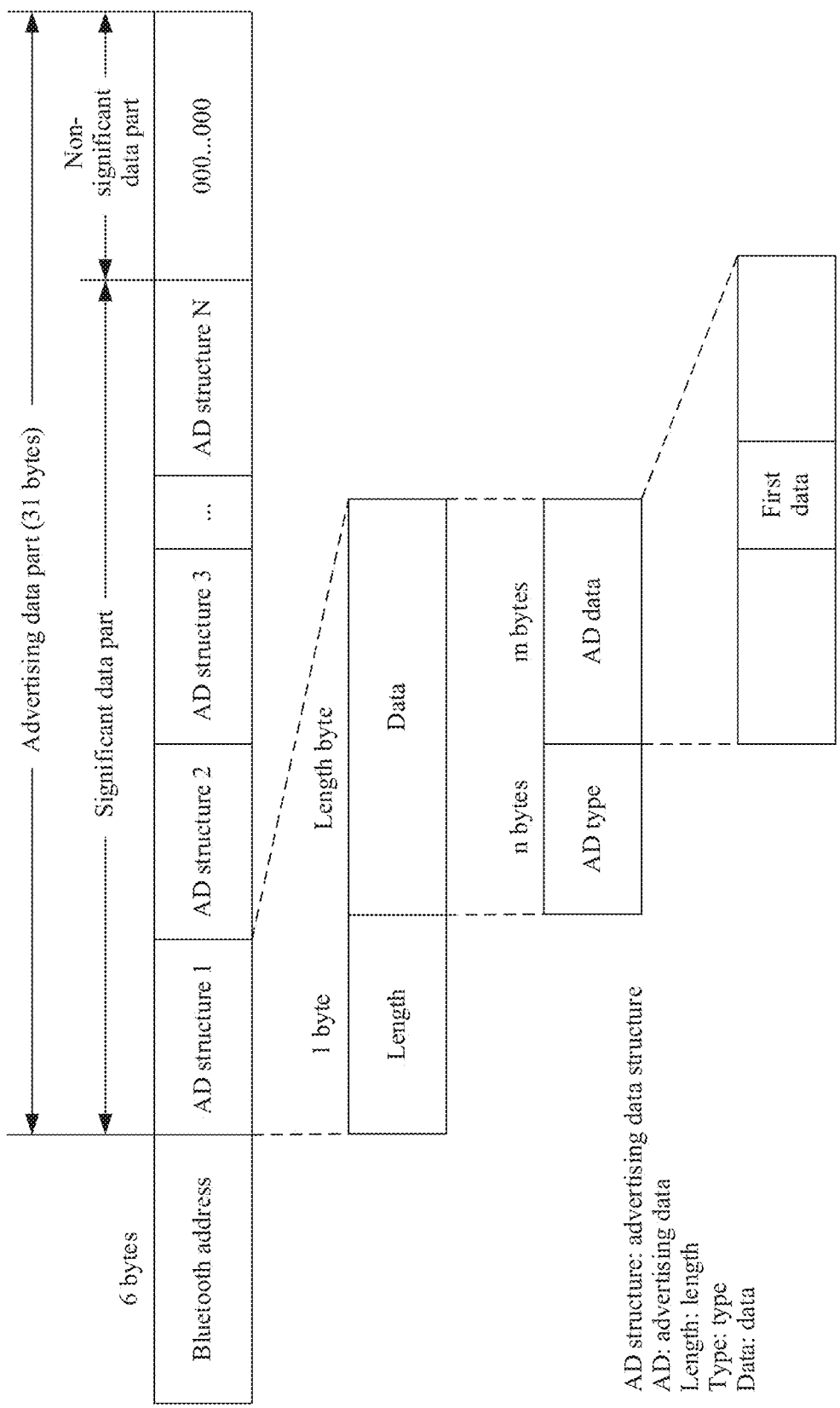
FIG. 4B is a schematic diagram of a data format of a first BLE advertising signal according to an embodiment of this application.

In a possible implementation, the first BLE advertising signal includes a first AD structure, and the first AD structure includes first data. Specifically, for a data format of the first BLE advertising signal, refer to a schematic diagram shown in FIG. 4B. The first BLE advertising signal may include a Bluetooth address and an advertising data (AdvData, AD) part of the peripheral device. The advertising data part includes a significant data part (significant) and a non-significant data part (non-significant). Specifically, the significant data part includes one or more advertising data structures (AD Structure). The significant data part includes the first AD structure, the first AD structure includes the first data. The first data indicates that the peripheral device sends a page request to the central device, and the central device does not page the peripheral device. The data format of the first BLE advertising signal shown in FIG. 4B is described in detail in subsequent content. Details are not described herein.

In another possible implementation, the peripheral device specifically sends the first BLE advertising signal to the central device in the following manner: The peripheral device sends the first BLE advertising signal to the central device for a first preset quantity of times, where the first preset quantity of times may be one, two, three, four, or the like. A first time interval between two adjacent first BLE reconnection advertising signals is a preset time interval such as 100 ms, 150 ms, 200 ms, and 300 ms. Both the first preset quantity of times and the first time interval may be set as required. This is not limited in the embodiments of this application.

In still another possible implementation, after the central device receives the first BLE advertising signal, the central device maintains a BLE scan state based on the first BLE advertising signal. Optionally, the central device specifically maintains the BLE scan state based on the first BLE advertising signal in the following method: First, the central device determines, based on the first BLE advertising signal, that the Bluetooth address of the peripheral device is consistent with a Bluetooth address in a prestored historical connection record. Then, the central device parses the first BLE reconnection advertising signal to determine that the first advertising signal includes the first data. Next, the central device determines, based on the first data, to maintain the BLE scan state. The historical connection record of the central device stores Bluetooth addresses of one or more peripheral devices that are successfully paired with the central device through Bluetooth.

In yet another possible implementation, after the central device receives the first BLE advertising signal, if the central device receives a Bluetooth connection request sent by a third-party application, or a tap operation performed by a user on an unconnected Bluetooth device option in a Bluetooth device interface, the central device does not initiate paging to the peripheral device. In this manner, a problem that when the peripheral device initiates paging to the central device, the central device also initiates paging to the peripheral device can be avoided, a page request collision does not occur, and a success rate of a Bluetooth reconnection can be improved.

S303: After sending the first BLE advertising signal to the central device, the peripheral device sends a page packet to the central device.

In a possible implementation, the peripheral device sends the page packet to the central device within preset time in which the first BLE advertising signal is sent to the central device. The page packet includes a device access code of the central device. When sending the page packet to the central device, the peripheral device is in a page state.

In addition, a second time interval between two adjacent page packets sent by the peripheral device to the central device is a preset time interval such as 100 ms, 150 ms, 200 ms, or 300 ms. It should be noted that if the peripheral device does not receive an ID packet fed back by the central device based on the page packet within preset duration, the peripheral device determines page timeout (page timeout), no longer sends a page packet to the central device, and switches from the page state to a page scan state. A value range of the preset duration may be 0.625 ms to 40.9 s. If the ID packet fed back by the central device based on the page packet is received within the preset duration, the peripheral device no longer sends a page packet to the central device, and switches from the page state to a master page response state.

In another possible implementation, after receiving the page packet sent by the peripheral device, the central device may stop BLE scanning. In this manner, power consumption of the central device can be reduced.

S304: After receiving the page packet sent by the peripheral device, the central device sends the ID packet to the peripheral device based on the page packet.

Optionally, the central device may send the ID packet to the peripheral device based on the page packet in the following manner: The central device determines, based on the page packet, that the page packet includes the device access code of the central device, and sends the ID packet to the peripheral device.

S305: After receiving the ID packet sent by the central device, the peripheral device sends an FHS packet to the central device based on the ID packet.

S306: After receiving the FHS packet sent by the peripheral device, the central device sends an ID packet to the peripheral device based on the FHS packet.

After receiving the FHS packet sent by the peripheral device, the central device switches from a slave page response state to a connection (connection) state. In addition, after receiving the ID packet sent by the central device, the peripheral device switches from the master page response (slave page response) state to the connection (connection) state. In this case, both the central device and the peripheral device are in the connection state, and the Bluetooth connection is restored. It should be noted that, for specific implementations of S304 to S306, refer to the implementations of S102 to S104. Details are not described herein again.

FIG. 4A is a schematic diagram of a user interface for displaying reconnection indication information on a central device according to an embodiment of this application.

FIG. 4A is an example of a schematic diagram of a user interface 41 for displaying music playing. The user interface 41 includes a download control 415, a sharing control 416, a more control 417, playing progress indication information 414, a play/pause control 411, a previous song control 413, a next song control 412, and a notification window 418.

The download control 415 may be used to receive a user operation, and in response to the user operation, the central device 100 stores a currently played song in the central device.

The sharing control 416 may be used to receive a user operation, and in response to the user operation, the central device 100 displays one or more sharing options, for example, WeChat friends, Moments, Weibo, QQ friends, and Copy link. A user can select a sharing option to share the currently played song to an address corresponding to the sharing option.

The more control 417 may be used to receive a user operation, and in response to the user operation, the central device 100 displays a menu window. The menu window may include one or more operation options, for example, add to a playlist, delete, view an artist, view an album, or play a video.

The playing progress indication information 414 may be used to indicate a playing progress of the current song, and may include information such as a progress bar, a current playing moment, and total duration of the song.

The play/pause control 411 may be used to switch a play/pause state of the song. Specifically, when the current song is being played by using a Bluetooth headset, if a Bluetooth connection is disconnected, the play/pause control 411 switches from displaying a first state to displaying a second state, where the first state is used to indicate that the current song is in the play state, and the second state is used to indicate that the current song is in the pause state.

The previous song control 413 may be used to receive a user operation, and in response to the user operation, the central device 100 switches from playing the current song to playing a song that is previous to the current song.

The next song control 412 may be used to receive a user operation, and in response to the user operation, the central device 100 switches from playing the current song to playing a song that is next to the current song.

The notification window 418 may be used to display reconnection indication information 410. The reconnection indication information 410 is used to indicate that the central device is restoring the Bluetooth connection. In a possible implementation, the notification window 418 disappears after being displayed for preset time. The preset time may be a time value such as 4 s or 5 s. Alternatively, when the notification window 418 receives an upward swipe operation of the user, the central device 100 no longer displays the notification window 418 in the user interface 41 in response to the operation.

FIG. 4B is a schematic diagram of a data format of a first BLE advertising signal according to an embodiment of this application. The first BLE advertising signal may include a Bluetooth address and an advertising data part of a peripheral device. The advertising data part includes a significant data part and a non-significant data part. The Bluetooth address of the peripheral device occupies 6 bytes (byte), and the advertising data part occupies 31 bytes.

As shown in FIG. 4B, the significant data part includes N AD structures. An AD structure is used to describe information about an electronic device that sends the BLE reconnection advertising signal. Specifically, an AD structure includes a length field and a data field, and the data field includes an AD type field and an AD data field.

The length field indicates lengths of the AD type field and the AD data field, the AD type field indicates meaning of the AD data field, and the AD data field includes information describing the electronic device that sends the BLE reconnection advertising signal. For example, the AD type may be "flag", and "flag" indicates a physical connection function of the electronic device. The physical connection function of the electronic device may be learned by parsing the AD data field. For example, the physical connection function may be a limited discovery mode, a common discovery mode, a mode that does not support a classic Bluetooth mode, or the like.

Because the advertising data part needs to occupy 31 bytes, if the significant data part is less than 31 bytes, a remaining part in the advertising data part is filled with 0, and data of 0 in this part is the non-significant data part.

It should be noted that the first AD structure described in the foregoing content may be any one of the N AD structures, and a location of first data in the AD data may also be set based on a requirement. For example, the first data may be 1.

Figure 5:
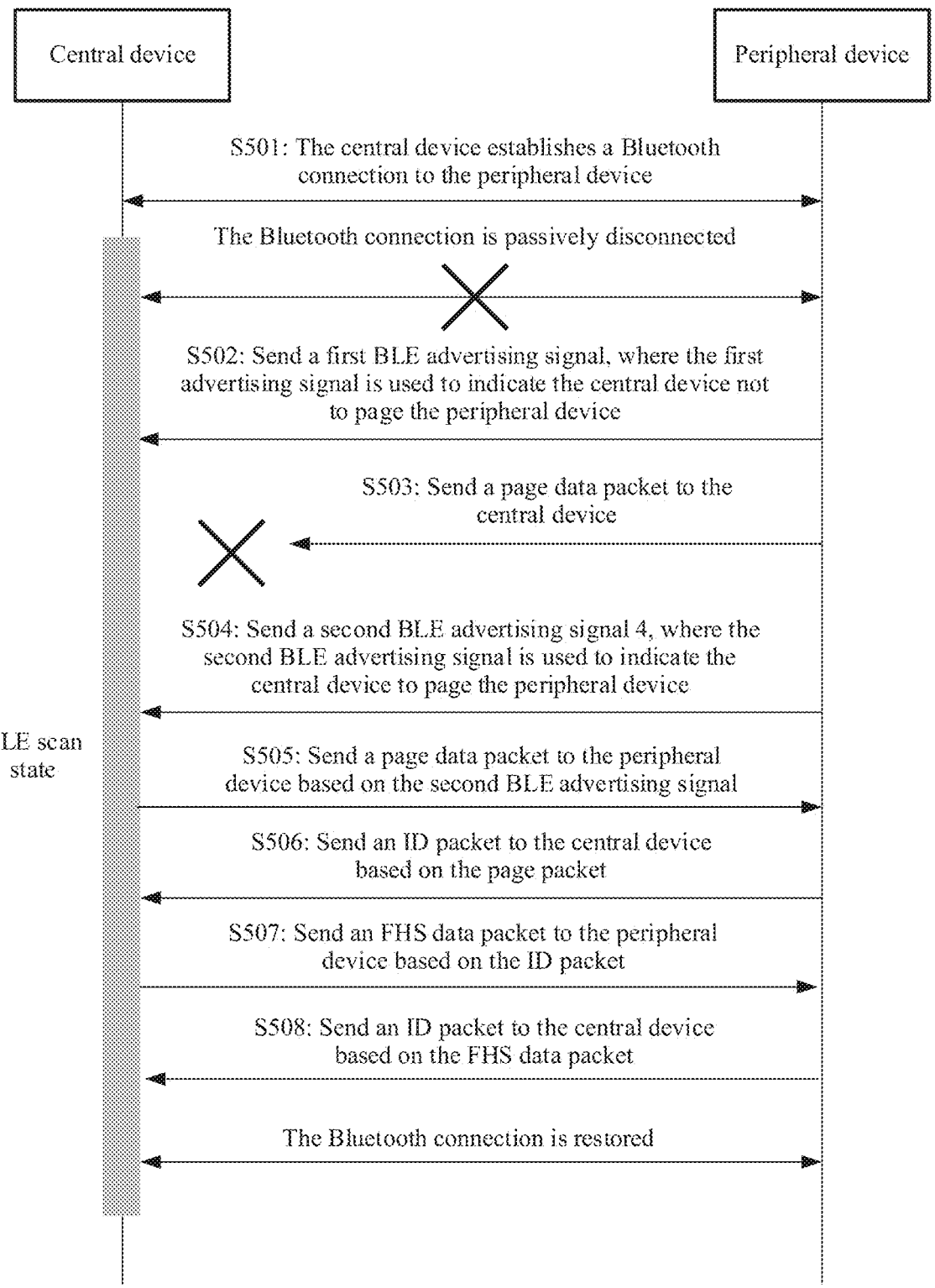
FIG. 5 is a schematic flowchart of still another Bluetooth reconnection method according to an embodiment of this application.

In another possible implementation, after the peripheral device sends a page packet to a central device, the central device may not successfully receive the page packet sent by the peripheral device. In this case, if the peripheral device does not receive an ID packet sent by the central device within preset duration, the peripheral device determines that paging timed out, no longer sends a page packet to the central device, and sends a second BLE advertising signal to the central device, where the second BLE advertising signal is used to indicate the peripheral device to page the central device. For this embodiment, refer to a schematic flowchart of still another Bluetooth reconnection method shown in FIG. 5. The method includes at least the following steps.

S501: A central device establishes a Bluetooth connection to a peripheral device.

S502: After the Bluetooth connection is passively disconnected, the peripheral device sends a first BLE advertising signal to the central device, where the first BLE advertising signal is used to indicate the central device not to page the peripheral device.

S503: After sending the first BLE advertising signal to the central device, the peripheral device sends a page packet to the central device.

For specific implementations of steps S501 to S503, refer to the implementations of S301 to S303 in FIG. 3. Details are not described herein again.

S504: If the peripheral device does not receive an ID packet sent by the central device within preset duration, the peripheral device sends a second BLE advertising signal to the central device, where the second BLE advertising signal is used to indicate the central device to page the peripheral device.

Specifically, if the peripheral device does not receive the ID packet sent by the central device within the preset duration, the peripheral device determines that paging timed out, no longer sends a page packet to the central device, and sends the second BLE advertising signal to the central device.

Figure 4C:
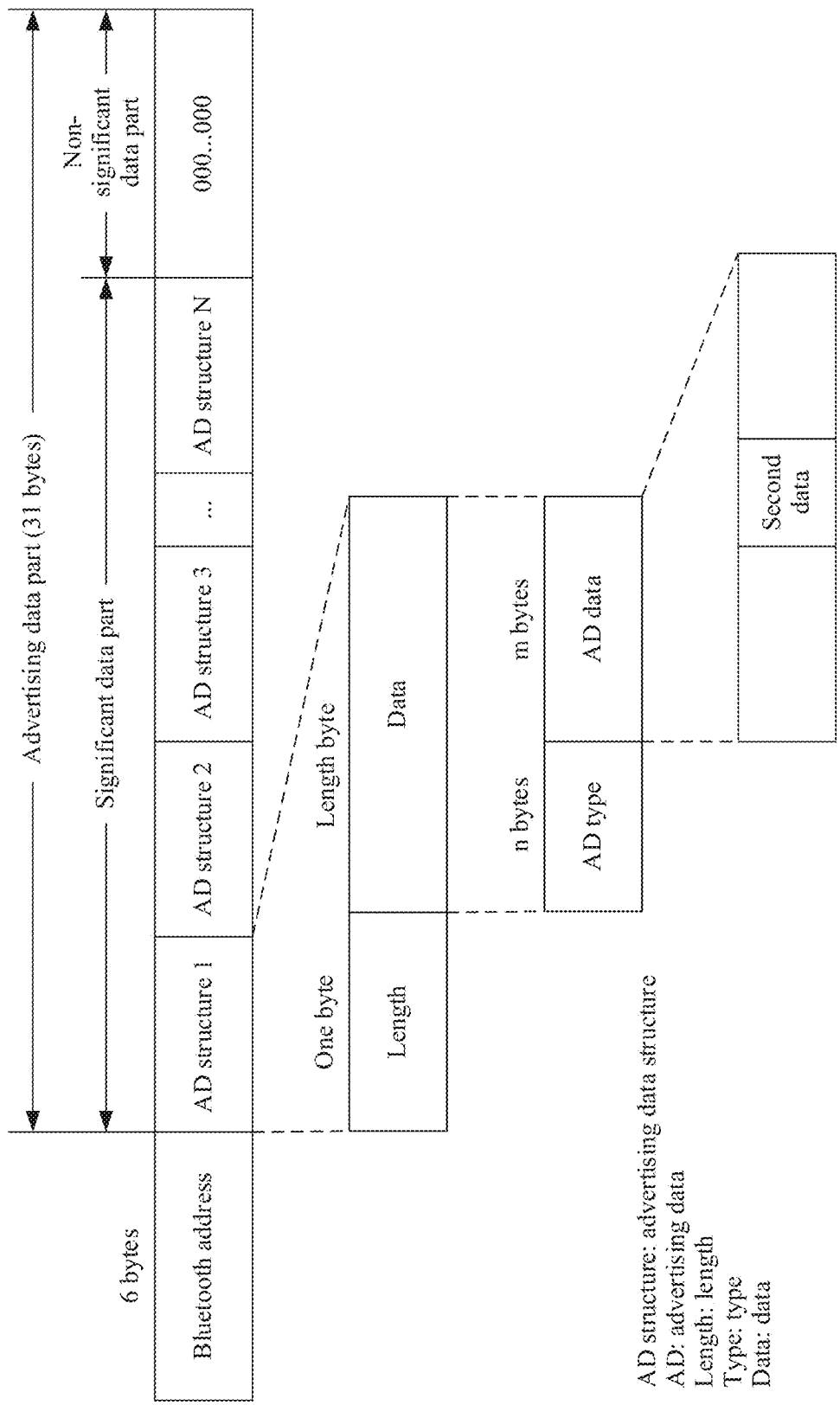
FIG. 4C is a schematic diagram of a data format of a second BLE advertising signal according to an embodiment of this application.

In a possible implementation, the second BLE reconnection advertising signal includes a second AD structure, and the second AD structure includes second data. Specifically, for a data format of the second BLE advertising signal, refer to the schematic diagram of the data format of the second BLE advertising signal shown in FIG. 4C. It should be noted that the data format of the second BLE advertising signal is similar to a data format of a first BLE advertising signal. A difference between the first BLE advertising signal and the second BLE advertising signal is that the second BLE advertising signal includes the second AD structure, and the second AD structure includes the second data. The second AD structure may be any one of N AD structures, and a location of the second data in AD data may also be set based on a requirement. For example, the second data may be 0.

In a possible implementation, a second time interval between two adjacent second BLE reconnection advertising signals sent by the peripheral device to the central device is a preset time interval such as 100 ms, 150 ms, 200 ms, and 300 ms. Optionally, when receiving a page packet fed back by the central device based on the second BLE advertising signal, the peripheral device no longer sends a second BLE advertising signal to the central device.

S505: After receiving the second BLE advertising signal, the central device sends the page packet to the peripheral device based on the second BLE advertising signal.

In a possible implementation, the central device specifically sends the page packet to the peripheral device based on the second BLE advertising signal in the following method: First, the central device determines, based on the second BLE advertising signal, that a Bluetooth address of the peripheral device is consistent with a Bluetooth address in a prestored historical connection record. Then, the central device parses the second BLE reconnection advertising signal to determine that the second advertising signal includes second data. Next, the central device sends an ID packet to the peripheral device based on the second data. The ID packet carries a device access code or an inquiry access code of the central device.

Specifically, the page packet sent by the central device to the peripheral device includes a DAC of the peripheral device. Optionally, the central device sends page packets to the peripheral device for a plurality of times, and a time interval between two adjacent page packets sent by the central device to the peripheral device is a preset time interval such as 100 ms, 150 ms, 200 ms, or 300 ms. It should be noted that if the central device receives an ID packet fed back by the peripheral device based on the page packet within the preset duration, the central device no longer sends a page packet to the peripheral device, and switches from a page state to a master page response state.

In another possible implementation, after the central device receives the second BLE advertising signal, the central device may stop BLE scanning. In this manner, power consumption of the central device can be reduced.

S506: After receiving the page packet sent by the central device, the peripheral device sends the ID packet to the central device based on the page packet.

Optionally, the peripheral device may send the ID packet to the central device based on the page packet in the following manner: The peripheral device determines, based on the page packet, that the page packet includes the device access code of the peripheral device, and sends the ID packet to the central device. The ID packet carries the device access code or an inquiry access code of the peripheral device. In this case, the peripheral device switches from a page scan (page scan) state to a slave page response (slave page response) state.

S507: After receiving the ID packet sent by the peripheral device, the central device sends an FHS packet to the peripheral device based on the ID packet.

The FHS packet sent by the central device to the peripheral device includes information such as a Bluetooth address and a real-time clock of the central device. It should be noted that, after receiving the ID packet sent by the peripheral device, the central device switches from the page state to the master page response (master page response) state.

S508: After receiving the FHS packet sent by the central device, the peripheral device sends an ID packet to the central device based on the FHS packet.

The ID packet carries the device access code or the inquiry access code of the peripheral device. After receiving the FHS packet sent by the central device, the peripheral device switches from the slave page response state to a connection (connection) state. In addition, after receiving the ID packet sent by the peripheral device, the central device switches from the master page response (slave page response) state to the connection (connection) state. In this case, both the central device and the peripheral device are in the connection state, and the Bluetooth connection is restored.

Optionally, after receiving the ID packet sent by the central device, the central device may send a poll packet to the peripheral device based on the ID packet. The poll packet is used to check whether a slave device (the peripheral device) is started. After receiving the poll packet, the peripheral device may send any type of packet to the central device based on the poll packet.

Figure 6:
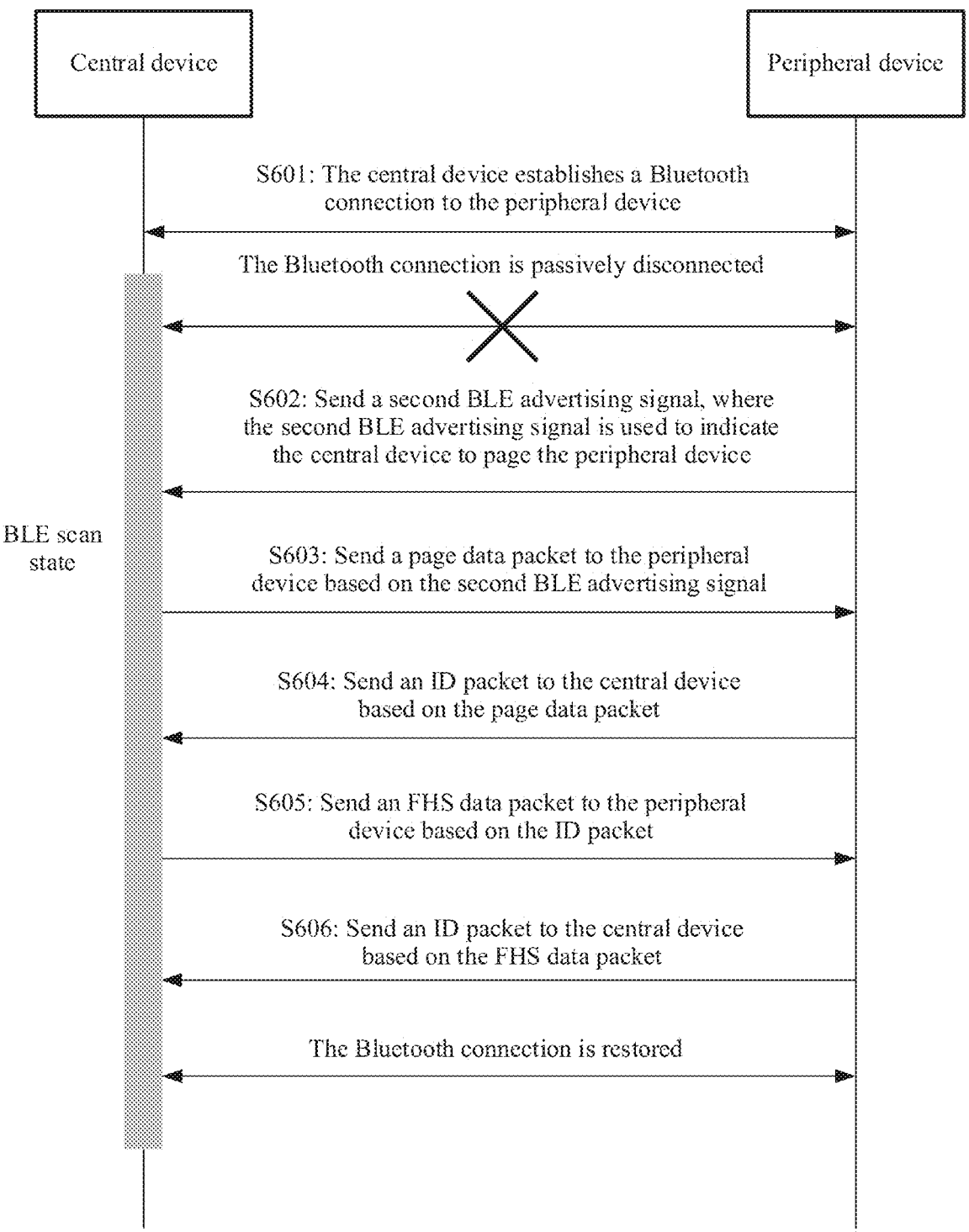
FIG. 6 is a schematic flowchart of yet another Bluetooth reconnection method according to an embodiment of this application.

In still another possible embodiment of this application, after the central device is disconnected from the peripheral device, the peripheral device first sends the second BLE advertising signal to the central device, where the second BLE advertising signal is used to indicate the central device to page the peripheral device. After the central device receives the second BLE advertising signal, the central device sends the page packet to the peripheral device, to restore the Bluetooth connection. For this embodiment, refer to a schematic flowchart of yet another Bluetooth reconnection method shown in FIG. 6. The method includes at least the following steps.

S601: A central device establishes a Bluetooth connection to a peripheral device.

For a specific implementation of step S601, refer to the implementation of S301 in FIG. 3. Details are not described herein again.

S602: After the Bluetooth connection is passively disconnected, the peripheral device sends a second BLE advertising signal to the central device, where the second BLE advertising signal is used to indicate the central device to page the peripheral device.

For the second BLE advertising signal, refer to the description in the foregoing content. Details are not described herein again.

S603: After receiving the second BLE advertising signal, the central device sends a page packet to the peripheral device based on the second BLE advertising signal.

In a possible implementation, after receiving the second advertising signal, the central device may stop BLE scanning. In this manner, power consumption of the central device can be reduced.

S604: After receiving a page packet sent by the central device, the peripheral device sends an ID packet to the central device based on the page packet.

S605: After receiving the ID packet sent by the peripheral device, the central device sends an FHS packet to the peripheral device based on the ID packet.

S606: After receiving the FHS packet sent by the central device, the peripheral device sends an ID packet to the central device based on the FHS packet. After receiving the FHS packet sent by the central device, the peripheral device switches from a slave page response state to a connection (connection) state. In addition, after receiving the ID packet sent by the peripheral device, the central device switches from a master page response (slave page response) state to the connection (connection) state. In this case, both the central device and the peripheral device are in the connection state, and a Bluetooth connection is restored. For specific implementations of steps S602 to S606, refer to the implementations of steps S504 to S508 in FIG. 5. Details are not described herein again.

In any one of the foregoing embodiments, within a preset time period in which the Bluetooth connection between the central device and the peripheral device is passively disconnected, if the central device does not receive a BLE advertising signal (including a first BLE advertising signal and the second BLE advertising signal) sent by the peripheral device, the central device may send a page packet to the peripheral device to restore the Bluetooth connection. It should be noted that, for a procedure after the central device sends the page packet to the peripheral device, refer to the implementations of steps S604 to S606. Details are not described herein again.

In a specific scenario, the central device may be a mobile terminal, and the peripheral device may be a Bluetooth headset. In a process in which the user plays a song in the mobile terminal by using the Bluetooth headset, if a user wears the Bluetooth headset and leaves an area near the mobile terminal, and a distance between the Bluetooth headset and the mobile terminal exceeds a maximum distance in which the Bluetooth connection is supported, the Bluetooth connection between the mobile terminal and the Bluetooth headset is passively disconnected. After the Bluetooth connection between the mobile terminal and the Bluetooth headset is passively disconnected, the Bluetooth headset sends a BLE advertising signal to the mobile terminal. If the mobile terminal determines that the received BLE advertising signal is the first BLE advertising signal, the mobile terminal does not page the Bluetooth headset, and waits to receive a page packet sent by the Bluetooth headset. If the mobile terminal determines that the received BLE advertising signal is the second BLE advertising signal, the mobile terminal actively pages the Bluetooth headset, and the Bluetooth headset waits to receive a page packet sent by the mobile terminal. This manner can avoid a page request collision caused by sending page packets by the mobile terminal and the Bluetooth headset at the same time, and improve a success rate of a Bluetooth reconnection.

The steps performed by the first device in the Bluetooth reconnection method provided in the embodiments of this application may alternatively be performed by a Bluetooth chip included in the first device. When running, the Bluetooth chip invokes a computer program stored in a memory, to implement the steps performed by the first device. Similarly, in the foregoing embodiments, the steps performed by the second device may alternatively be performed by a Bluetooth chip included in the second device. When running, the Bluetooth chip invokes a computer program stored in a memory, to implement the steps performed by the second device.

The foregoing embodiments are merely intended for describing the technical solutions of this application, but not for limiting this application. Although this application is described in detail with reference to the foregoing embodiments, a person of ordinary skill in the art should understand that modifications to the technical solutions recorded in the foregoing embodiments or equivalent replacements to some technical features thereof may still be made, without departing from the scope of the technical solutions of the embodiments of this application.

What is claimed is:

1. A BLUETOOTH reconnection method implemented by a BLUETOOTH connection system, wherein the BLUETOOTH reconnection method comprises:
   sending, by a first device of the BLUETOOTH connection system, a first BLUETOOTH Low Energy (BLE) advertising signal to a second device of the BLUETOOTH connection system when a BLUETOOTH connection is disconnected, wherein the first BLE advertising signal instructs the second device to avoid paging to the first device;
   sending, by the first device to the second device, a first page packet comprising a first device identifier of the second device;
   sending, by the first device, a first frequency hopping synchronization (FHS) packet to the second device when receiving, within a preset duration and based on the first page packet, a first identifier (ID) packet from the second device, wherein the first ID packet comprises the first device identifier, and wherein the first FHS packet comprises a first BLUETOOTH address of the first device and first clock information of the first device;
   receiving, by the second device, the first FHS packet;
   switching, by the second device, to a connection state based on the first FHS packet;
   sending, by the second device to the first device, a second ID packet comprising the first device identifier;
   receiving, by the first device, the second ID packet; and
   switching, by the first device, to the connection state based on the second ID packet.

2. The BLUETOOTH reconnection method of claim 1, further comprising:
   sending, by the first device, a second BLE advertising signal to the second device when the first device does not receive, within the preset duration, the first ID packet, wherein the second BLE advertising signal instructs the second device to initiate the paging to the first device;
   sending, by the second device, to the first device, and based on the second BLE advertising signal, a second page packet comprising a second device identifier of the first device;
   receiving, by the first device, the second page packet;
   sending, by the first device, to the second device, and based on the second page packet, a third ID packet comprising the second device identifier;
   receiving, by the second device, the third ID packet;
   sending, by the second device, to the first device, and based on the third ID packet, a second FHS packet comprising a second BLUETOOTH address of the second device and second clock information of the second device;
   receiving, by the first device, the second FHS packet;
   switching, by the first device based on the second FHS packet, to the connection state;
   sending, by the first device to the second device, a fourth ID packet comprising the second device identifier;
   receiving, by the second device, the fourth ID packet; and
   switching, by the second device, to the connection state based on the fourth ID packet.

3. The BLUETOOTH reconnection method of claim 1, further comprising:
   receiving, by the first device, within the preset duration, and from the second device, the first ID packet; and
   switching, by the first device in response to receiving the first ID packet, from a page state to a master page response state.

4. The BLUETOOTH reconnection method of claim 2, further comprising:
  switching, by the first device, from a page scan state to a slave page response state when the first device receives the second page packet from the second device; and
  switching, by the second device, from a page state to a master page response state when the second device receives the third ID packet from the first device.

5. The BLUETOOTH reconnection method of claim 1, further comprising:
  identifying, by the first device, that a received signal strength indicator (RSSI) of the BLUETOOTH connection is less than a preset threshold; and
  further sending, by the first device, to the second device, and in response to identifying that the RSSI is less than the preset threshold, the first BLE advertising signal.

6. The BLUETOOTH reconnection method of claim 1, wherein the second device is in a BLE scan state when the BLUETOOTH connection is disconnected.

7. The BLUETOOTH reconnection method of claim 1, further comprising:
  receiving, by the first device, an error code indicating a connection timeout; and
  further sending, by the first device, to the second device, and in response to receiving the error code, the first BLE advertising signal.

8. A BLUETOOTH reconnection method implemented by a BLUETOOTH connection system, wherein the BLUETOOTH reconnection method comprises:
  sending, by a first device of the BLUETOOTH connection system, a BLUETOOTH Low Energy (BLE) advertising signal to a second device of the BLUETOOTH connection system when a BLUETOOTH connection is disconnected, wherein the BLE advertising signal instructs the second device to initiate paging to the first device;
  receiving, by the second device, the BLE advertising signal;
  sending, by the second device, to the first device, and based on the BLE advertising signal, a page packet comprising a device identifier of the first device;
  receiving, by the first device, the page packet;
  sending, by the first device, to the second device based on the page packet, a first identifier (ID) packet comprising the device identifier;
  receiving, by the second device, the first ID packet;
  sending, by the second device, to the first device, and based on the first ID packet, a frequency hopping synchronization (FHS) packet comprising a BLUETOOTH address of the second device and clock information of the second device;
  receiving, by the first device, the FHS packet;
  switching, by the first device based on the FHS packet, to a connection state;
  sending, by the first device, a second ID packet to the second device;
  receiving, by the second device, the second ID packet; and
  switching, by the second device based on the second ID packet, to the connection state.

9. The BLUETOOTH reconnection method of claim 8, further comprising:
  switching, by the first device, from a page scan state to a slave page response state when the first device receives the page packet from the second device; and
  switching, by the second device, from a page state to a master page response state when the second device receives the first ID packet from the first device.

10. The BLUETOOTH reconnection method of claim 8, further comprising:
  identifying, by the first device, that a received signal strength indicator (RSSI) of the BLUETOOTH connection is less than a preset threshold; and
  sending, by the first device, to the second device in response to identifying that the RSSI is less than the preset threshold, the BLE advertising signal.

11. The BLUETOOTH reconnection method of claim 8, wherein the second device is in a BLE scan state when the BLUETOOTH connection is disconnected.

12. The BLUETOOTH reconnection method of claim 8, further comprising:
  receiving, by the first device, an error code indicating a connection timeout; and
  further sending, by the first device, to the second device, and in response to receiving the error code, the BLE advertising signal.

13. A first device comprising:
  a BLUETOOTH chip configured to support a classic BLUETOOTH Basic Rate (BR)/Enhanced Data Rate (EDR) function and a BLUETOOTH Low Energy (BLE) function;
  a memory configured to store computer instructions; and
  one or more processors coupled to the BLUETOOTH chip and the memory, wherein when executed by the one or more processors, the computer instructions cause the first device to:
    send a first BLE advertising signal to a second device when a BLUETOOTH connection is disconnected, wherein the first BLE advertising signal instruct the second device to avoid initiating paging to the second device;
    send, to the second device, a first page packet comprising a first device identifier of the second device;
    send a first frequency hopping synchronization (FHS) packet to the second device when receiving, within a preset duration and based on the first page packet, a first identifier (ID) packet from the second device, wherein the first ID packet comprises the first device identifier, and wherein the first FHS packet comprises a first BLUETOOTH address of the first device and first clock information of the first device;
    receive, from the second device based on the first FHS packet, a second ID packet; and
    switch, based on the second ID packet, to a connection state.

14. The first device of claim 13, wherein when executed by the one or more processors, the computer instructions further cause the first device to:
  send a second BLE advertising signal to the second device when the first ID packet is not received within the preset duration, wherein the second BLE advertising signal instructs the second device to initiate the paging to the first device;
  receive, from the second device based on the second BLE advertising signal, a second page packet comprising a second device identifier of the first device;
  send, to the second device based on the second page packet, a third ID packet comprising the second device identifier;
  receive, from the second device based on the third ID packet, a second FHS packet comprising a second BLUETOOTH address of the second device and second clock information of the second device;
switch, based on the second FHS packet, to a connection state; and
send, to the second device based on the second FHS packet, a fourth ID packet comprising the second device identifier.

15. The first device of claim 13, wherein when executed by the one or more processors, the computer instructions further cause the first device to:
receive, from the second device within the preset duration, the first ID packet; and
switch, in response to receiving the first ID packet within the preset duration, from a page state to a master page response state.

16. The first device of claim 14, wherein when executed by the one or more processors, the computer instructions further cause the first device:
receive, from the second device, the second page packet; and
switch, in response to receiving the second page packet, from a page scan state to a slave page response state.

17. The first device of claim 13, wherein when executed by the one or more processors, the computer instructions further cause the first device:
identify that a received signal strength indicator (RSSI) of the BLUETOOTH connection is less than a preset threshold or receive an error code indicating a connection timeout; and
further send, to the second device in response to identifying that the RSSI is less than the preset threshold receiving the error code, the first BLE advertising signal.

18. A first device comprising:
a BLUETOOTH chip configured to support a classic BLUETOOTH Basic Rate (BR)/Enhanced Data Rate (EDR) function and a BLUETOOTH Low Energy (BLE) function;
a memory configured to store computer instructions; and
one or more processors coupled to the BLUETOOTH chip and the memory, wherein when executed by the one or more processors, the computer instructions cause the first device to:
send a BLE advertising signal to a second device when a BLUETOOTH connection is disconnected, wherein the BLE advertising signal instructs the second device to initiate paging to the first device;
receive, from the second device based on the BLE advertising signal, a page packet comprising a device identifier of the first device;
send, to the second device based on the page packet, a first identifier (ID) packet comprising the device identifier;
receive, from the second device based on the first ID packet, a frequency hopping synchronization packet (FHS) comprising a BLUETOOTH address of the second device and clock information of the second device;
switch, based on the FHS packet, to a connection state; and
send, to the second device based on the FHS packet, a second ID packet comprising the device identifier, wherein the second ID packet instructs the second device to switch to the connection state.

19. The first device of claim 18, wherein when executed by the one or more processors, the computer instructions further cause the first device to:
receive, from the second device, the second page packet; and
switch, in response to receiving the second page packet, from a page scan state to a slave page response state.

20. The first device of claim 18, wherein when executed by the one or more processors, the computer instructions further cause the first device to:
identify that a received signal strength indicator (RSSI) of the BLUETOOTH connection is less than a preset threshold or receive an error code indicating a connection timeout; and
further send, to the second device in response to identifying that the RSSI is less than the preset threshold or receiving the error code, the BLE advertising signal.

* * * * *